(12) United States Patent
Moriyama

(10) Patent No.: US 11,012,230 B2
(45) Date of Patent: May 18, 2021

(54) COMMUNICATION APPARATUS AND CRYPTOGRAPHIC PROCESSING SYSTEM

(71) Applicant: Renesas Electronics Corporation, Tokyo (JP)

(72) Inventor: Daisuke Moriyama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 279 days.

(21) Appl. No.: 15/815,550

(22) Filed: Nov. 16, 2017

(65) Prior Publication Data
US 2018/0167205 A1    Jun. 14, 2018

(30) Foreign Application Priority Data

Dec. 13, 2016  (JP) .............. JP2016-241274
May 25, 2017   (JP) .............. JP2017-103589

(51) Int. Cl.
*H04L 9/08*    (2006.01)
*H04L 9/32*    (2006.01)
(Continued)

(52) U.S. Cl.
CPC .............. *H04L 9/0822* (2013.01); *G09C 1/00* (2013.01); *H04L 9/0866* (2013.01);
(Continued)

(58) Field of Classification Search
CPC ... H04L 9/0822; H04L 9/0866; H04L 9/0869; H04L 9/30; H04L 9/3278; H04L 9/14;
(Continued)

(56) References Cited

U.S. PATENT DOCUMENTS

2012/0321077 A1   12/2012  Shiota et al.
2013/0051552 A1*   2/2013  Handschuh .......... H04L 9/0866
                                                           380/44
(Continued)

FOREIGN PATENT DOCUMENTS

JP    2013-031151 A    2/2013
JP    2016-007033 A    1/2016

OTHER PUBLICATIONS

Yu, et al., "Secure and robust error correction for physical unclonable functions", Jan.-Feb. 2010, IEEE Design & Test of Computers, vol. 27, Issue: 1, pp. 48-65. (Year: 2010).*

(Continued)

*Primary Examiner* — Nelson S. Giddins
(74) *Attorney, Agent, or Firm* — McGinn IP Law Group, PLLC

(57) ABSTRACT

A cryptographic communication method using a dynamically-generated private key is provided. A signal generation unit outputs a second signal obtained by giving an error in a predetermined range to a signal obtained based on a first signal. An error correction generation unit outputs a third signal obtained based on the second signal and auxiliary information for correcting an error included in the second signal. A private-key generation unit generates a first private key based on the third signal. An encryption calculation unit outputs an encrypted signal obtained by encrypting a fourth signal based on the first private key.

20 Claims, 25 Drawing Sheets

(51) Int. Cl.
    *H04L 9/30*    (2006.01)
    *H04L 9/14*    (2006.01)
    *G09C 1/00*    (2006.01)

(52) U.S. Cl.
    CPC .............. *H04L 9/0869* (2013.01); *H04L 9/14*
        (2013.01); *H04L 9/30* (2013.01); *H04L 9/3278*
        (2013.01); *H04L 2209/24* (2013.01); *H04L*
        *2209/34* (2013.01); *H04L 2209/80* (2013.01)

(58) Field of Classification Search
    CPC .............. H04L 2209/24; H04L 2209/34; H04L
                        2209/80; G09C 1/00
    See application file for complete search history.

(56) References Cited

U.S. PATENT DOCUMENTS

| | | | | |
|---|---|---|---|---|
| 2014/0328481 | A1* | 11/2014 | Morioka | H04L 9/0816 380/28 |
| 2018/0006813 | A1* | 1/2018 | Van Der Leest | G09C 1/00 |
| 2018/0047126 | A1* | 2/2018 | Falkenstern | G06T 1/0028 |
| 2019/0221139 | A1* | 7/2019 | Schrijen | H04L 9/3278 |

OTHER PUBLICATIONS

Preneel, et al., "Key-Recovery Attacks on Universal Hash Function based MAC Algorithms", Aug. 17-21, 2008, Advances in Cryptology—CRYPTO 2008. CRYPTO 2008. Lecture Notes in Computer Science, vol. 5157. (Year: 2008).*
Skori, et al., "Robust Key Extraction from Physical Unclonable Functions", 2005, ACNS, LNCS 3531, p. 407-422; Hereinafter "Skori" (Year: 2005).*
Pim Tuyls and Lejla Batina, "RFID-Tags for Anti-Counterfeiting", pp. 1-17, CT-RSA 2006.
Extended European Search Report dated May 4, 2018 in corresponding European Application No. 17205821.6.
B. Skorie et al. "Robust Key Extraction from Physical Uncloneable Functions" dated Oct. 7, 2005.
Helena Handschuh et al. "Key-Recovery Attacks on Universal Hash Function Based MAC Algorithms" dated Aug. 17, 2008.
European Office Action dated May 8, 2019 for European Patent Application No. 17 205 821.6-1218.
Tuyls P. et al.: "Secret Key Generation from Classical Physics. Physical Uncloneable Functions", Jan. 1, 2005, pp. 1-20m XP007915147, Retrieved from the Internet: URL: http://members.home.nl/skoric/security/modHTDAI.pdf.
European Office Action dated Dec. 13, 2019, in European Patent Application No. 17 205 821.6-1218 with an English translation.
European Office Action dated Nov. 5, 2020, in European Patent Application No. 17 205 821.6-1218 with an English translation.

* cited by examiner

COMMUNICATION APPARATUS AND CRYPTOGRAPHIC PROCESSING SYSTEM

CROSS-REFERENCE TO RELATED APPLICATIONS

This application is based upon and claims the benefit of priority from Japanese patent application No. 2016-241274, filed on Dec. 13, 2016 and Japanese patent application No. 2017-103589, filed on May 25, 2017, the disclosure of which is incorporated herein in its entirety by reference.

BACKGROUND

The present disclosure relates to a communication apparatus and a cryptographic processing system.

Currently, various cryptographic methods are used to secure security in data communication. Among them, as a method for high security, a method using a physically unclonable function is known.

A problem that arises when the physically unclonable function is used is that it is impossible to make a replica of an apparatus for the physically unclonable function. Therefore, to have two apparatuses have a common key, one of the apparatuses stores an output value of a physically unclonable function in advance and the other apparatus uses a value that is dynamically generated by the physically unclonable function. However, the physically unclonable function does not always output a fixed value, but does output a value including a variation. Therefore, an error correction needs to be performed. Accordingly, for example, there has been proposed a form of implementation in which a first apparatus temporarily observes an output of a physically unclonable function and a second apparatus performs decryption of an error correction after performing the physically unclonable function, so that the second apparatus holds the same value as the output value of the physically unclonable function held by the first apparatus (Pim Tuyls and Lejla Batina, "RFID-Tags for Anti-Counterfeiting", CT-RSA 2006).

Further, another cryptographic method using a physically unclonable function has been proposed (Japanese Unexamined Patent Application Publication No. 2013-31151). In this cryptographic method, to have two apparatuses have a common key, a first apparatus generates the common key through a physically unclonable function and a second apparatus performs an encryption algorithm according to a public-key cryptographic method using a public key and thereby outputs cipher text. The second apparatus can restore the common key by performing a decryption algorithm according to the public-key cryptographic method.

Further, another cryptographic method using a physically unclonable function has been proposed (Japanese Unexamined Patent Application Publication No. 2016-7033). This cryptographic method does not use the mechanism in which a common key is shared with another apparatus. Instead, a value that is obtained by encrypting an error correction is stored in a server. Then, when necessary, the value obtained by the encryption is received from the server and each user can restore a key having a fixed value by correcting an error in a value derived from a physically unclonable function.

SUMMARY

However, the present inventors have found the following problem. Although all of the above-described cryptographic methods generate a private key by using a physically unclonable function, the generated private key has a fixed value. Therefore, if a quantum computer or a computer having a high computational ability comparable to a quantum computer is developed, there is a possibility that a private key consisting of a fixed value could be analyzed. Therefore, it is conceivable that the security of communication by the common-key cryptographic method could not necessarily be ensured.

Other objects and novel features will be more apparent from the following description in the specification and the accompanying drawings.

According to one embodiment, a communication apparatus includes: a signal generation unit configured to output a second signal obtained by giving an error in a predetermined range to a signal obtained based on a first signal; an error correction generation unit configured to output a third signal obtained based on the second signal and auxiliary information for correcting an error included in the second signal; a private-key generation unit configured to generate a first private key based on the third signal; and an encryption calculation unit configured to output an encrypted signal obtained by encrypting a fourth signal based on the first private key.

According to another embodiment, a communication apparatus includes: an error correction decryption unit configured to correct an error in a seventh signal based on auxiliary information for correcting an error in a second signal and thereby generate an eighth signal, the second signal being obtained by giving an error in a predetermined range to a signal obtained based on a first signal, the seventh signal being generated in advance by giving an error in a predetermined range to a signal obtained based on the first signal; a private-key generation unit configured to generate a fourth private key based on the eighth signal; and a decryption calculation unit configured to decrypt an encrypted signal based on the fourth private key and thereby generate a decrypted signal, the encrypted signal being generated by encrypting a fourth signal by a first private key generated based on the second signal.

According to another embodiment, a cryptographic processing system includes a first communication apparatus configured to encrypting a signal, and a second communication apparatus configured to decrypting a signal, in which the first communication apparatus includes: a signal generation unit configured to output a second signal obtained by giving an error in a predetermined range to a signal obtained based on a first signal; an error correction generation unit configured to output a third signal obtained based on the second signal and auxiliary information for correcting an error included in the second signal; a first private-key generation unit configured to generate a first private key based on the third signal; and an encryption calculation unit configured to output an encrypted signal obtained by encrypting a fourth signal based on the first private key, and the second communication apparatus includes: an error correction decryption unit configured to correct an error in a seventh signal based on the auxiliary information and thereby generate an eighth signal, the seventh signal being generated in advance by supplying the first signal to the signal generation unit; and a second private-key generation unit configured to generate a fourth private key based on the eighth signal; and a decryption calculation unit configured to decrypt the encrypted signal based on the fourth private key and thereby generate a decrypted signal.

According to an embodiment, it is possible to provide a cryptographic communication method using a dynamically-generated private key.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiments according to the present disclosure are explained hereinafter with reference to the drawings. The same symbols are assigned to the same components/structures throughout the drawings and duplicated explanations are omitted as appropriate.

First Embodiment

Figure 1:
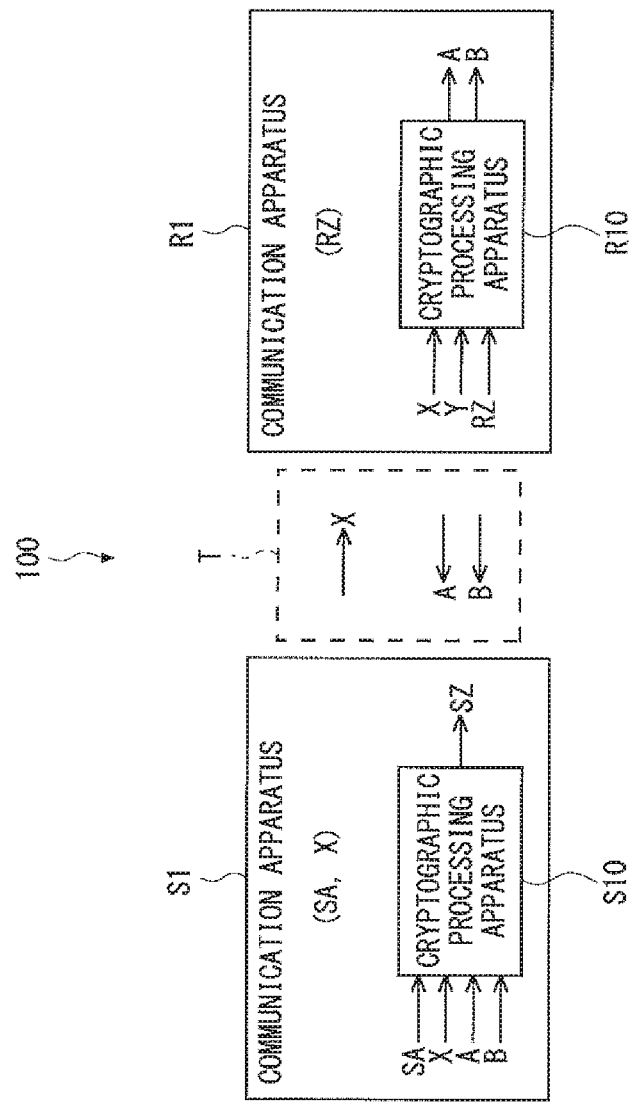
FIG. 1 schematically shows a configuration of a cryptographic processing system according to a first embodiment.

A cryptographic processing system 100 according to a first embodiment is explained. FIG. 1 schematically shows a configuration of the cryptographic processing system 100 according to the first embodiment. The cryptographic processing system 100 includes a communication apparatus S1 and a communication apparatus R1. The communication apparatus S1 includes a cryptographic processing apparatus S10 and the communication apparatus R1 includes a cryptographic processing apparatus R10.

In this embodiment, firstly, the cryptographic processing apparatus S10 of the communication apparatus S1 transmits a signal X (also referred to as a first signal) to the communication apparatus R1 through, for example, a communication network T.

In the communication apparatus R1, when the cryptographic processing apparatus R10 receives the signal X, the cryptographic processing apparatus R10 outputs an encrypted signal B, which is generated by encrypting a signal RZ to be transmitted (also referred to as a fourth signal) based on an output signal obtained by giving an error in a predetermined range to a signal obtained based on the signal X and a random number Y, to the communication apparatus S1. Further, the cryptographic processing apparatus R10 outputs auxiliary information A, which is used in a decryption process performed in the cryptographic processing apparatus S10, to the communication apparatus S1.

After that, the cryptographic processing apparatus S10 of the communication apparatus S1 can obtain a signal SZ by decrypting the encrypted signal B based on a signal SA (also referred to as a seventh signal) stored in advance in the cryptographic processing apparatus S10, the signal X, and the auxiliary information A.

Figure 2:
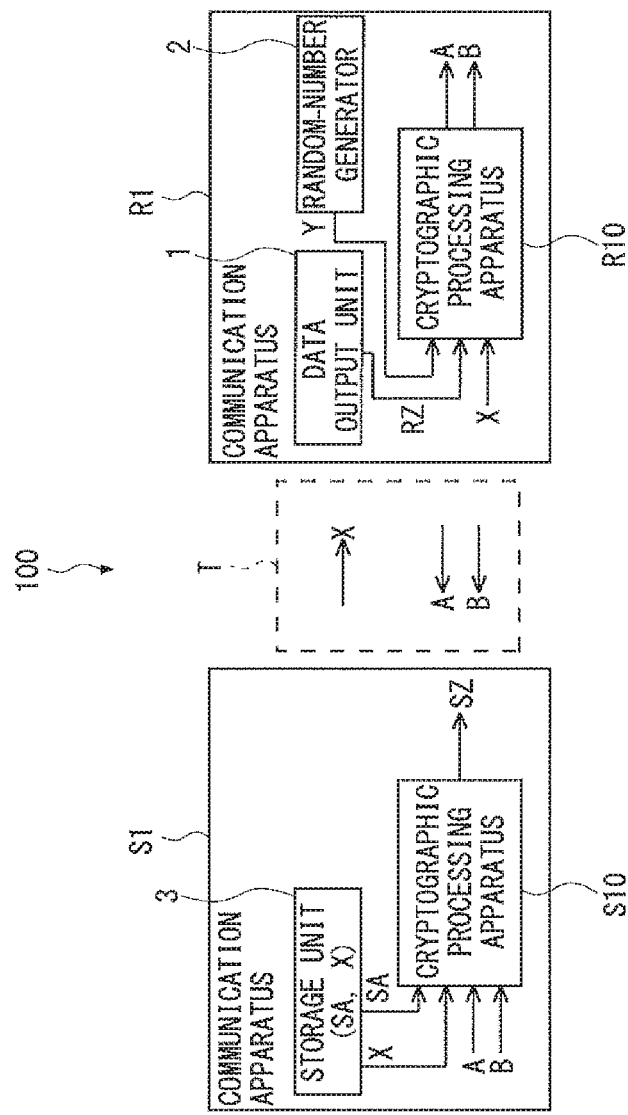
FIG. 2 schematically shows a configuration example of the cryptographic processing system according to the first embodiment.

FIG. 2 schematically shows a configuration example of the cryptographic processing system 100 according to the first embodiment. In FIG. 2, the communication apparatus R1 includes a data output unit 1 and a random-number generator 2 in addition to the cryptographic processing apparatus R10. The data output unit 1 generates a signal RZ and outputs the generated signal RZ to the cryptographic processing apparatus R10. The random-number generator 2 generates a random number Y and outputs the generated random number Y to the cryptographic processing apparatus R10. The communication apparatus S1 includes a storage unit 3 (also referred to as a second storage unit) in addition to the cryptographic processing apparatus S10. The above-described signal SA and the signal X are stored in advance in the storage unit 3. A method for storing the signal SA and the signal X in the storage unit 3 will be described later.

Figure 3:
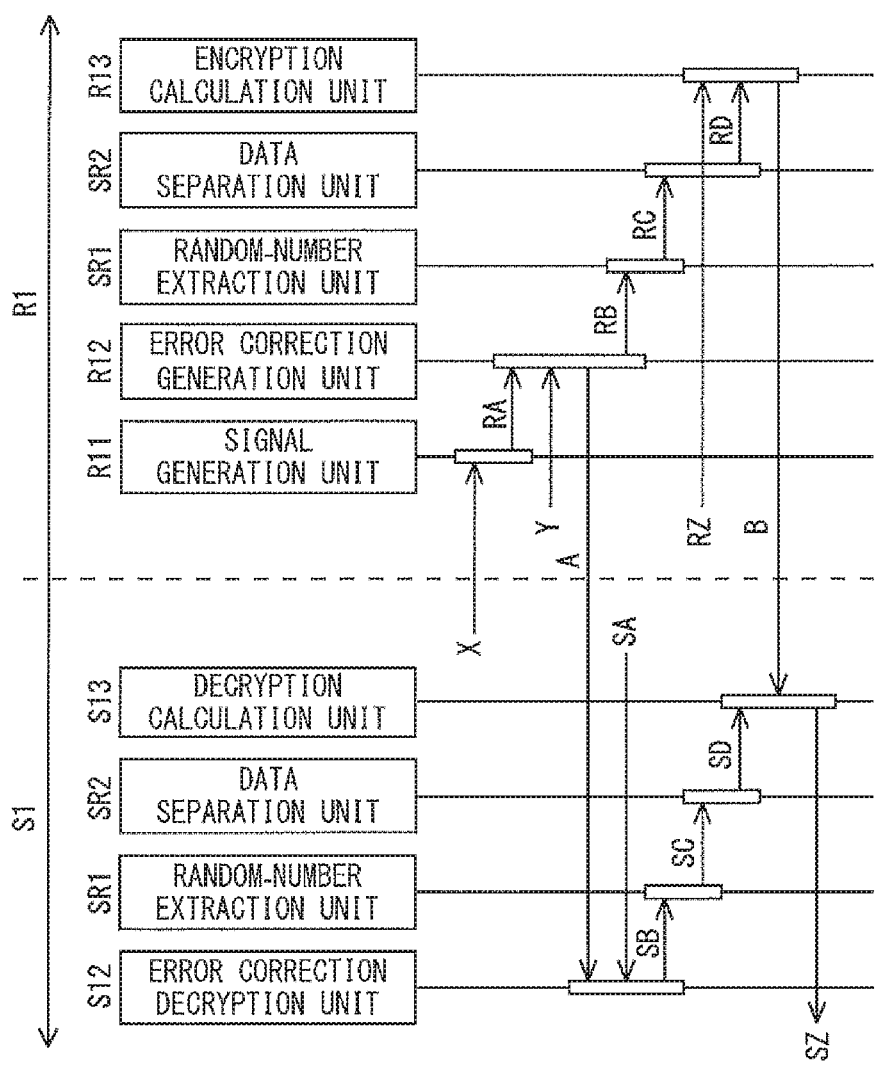
FIG. 3 is a sequence diagram showing exchanges of signals in the cryptographic processing system according to the first embodiment.
Figure 4:
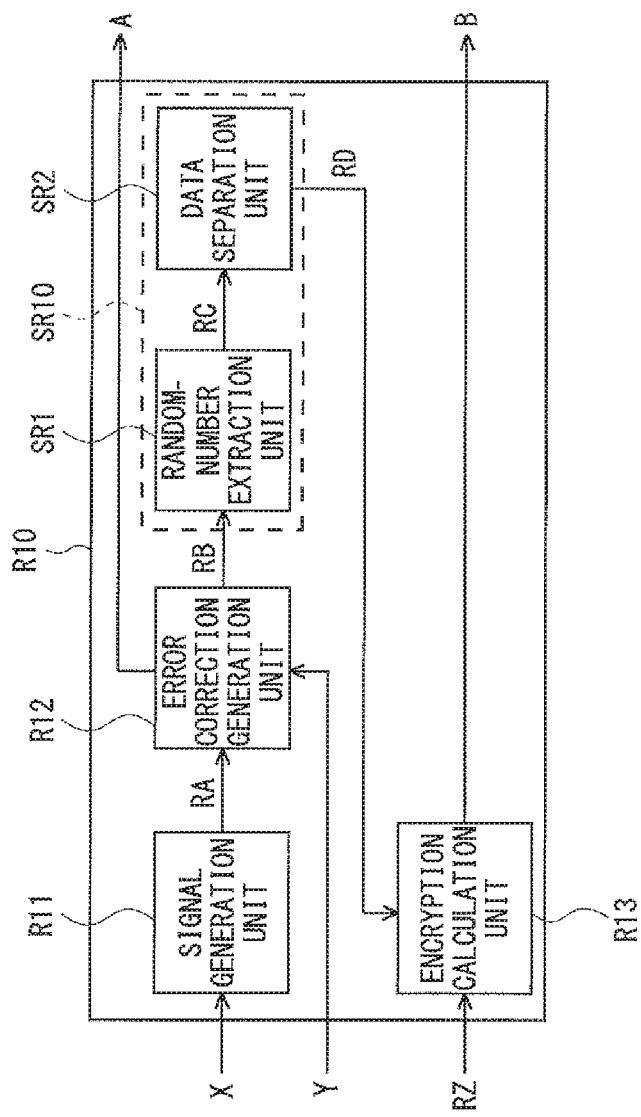
FIG. 4 schematically shows a configuration of a cryptographic processing apparatus according to the first embodiment.
Figure 5:
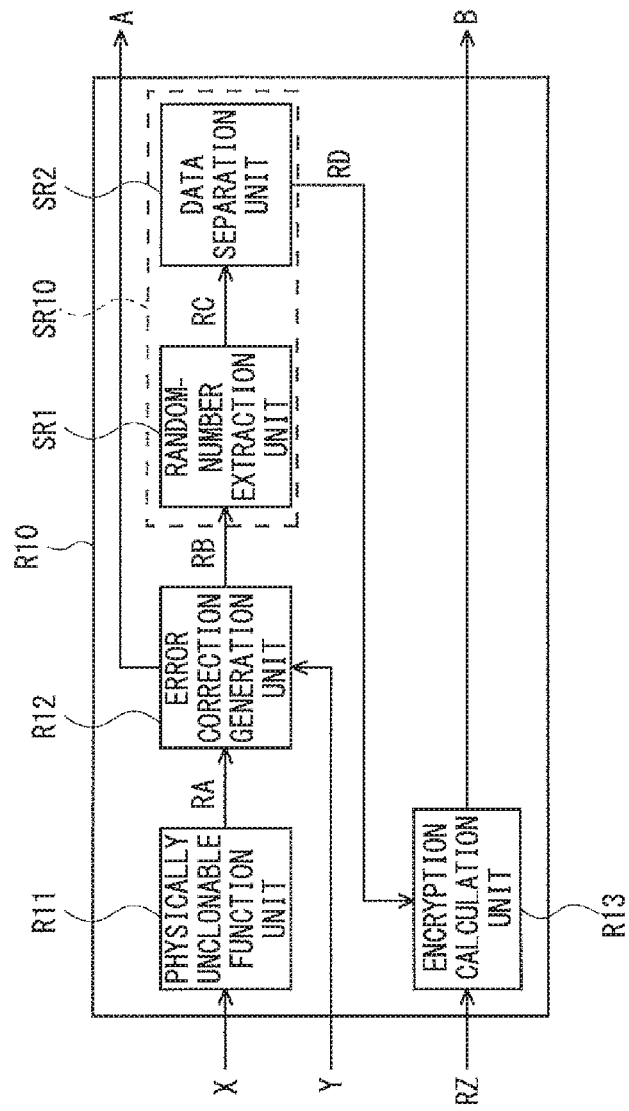
FIG. 5 schematically shows a configuration of the cryptographic processing apparatus according to the first embodiment.

A configuration and an operation of each part of the cryptographic processing system 100 are explained hereinafter with reference to FIGS. 3 to 5. FIG. 3 is a sequence diagram showing exchanges of signals in the cryptographic processing system 100 according to the first embodiment.

The cryptographic processing apparatus R10 is explained with reference to FIGS. 3 and 4. FIG. 4 schematically shows a configuration of the cryptographic processing apparatus R10 according to the first embodiment. The cryptographic processing apparatus R10 includes a signal generation unit R11, an error correction generation unit R12, a random-number extraction unit SR1, a data separation unit SR2, and an encryption calculation unit R13.

The signal generation unit R11 outputs a signal that is based on an arbitrary input signal and includes an error having a variation in a predetermined range. For example, an electric circuit implemented in hardware is used for the signal generation unit R11. The signal generation unit R11 may be formed as, for example, a physically unclonable function unit whose output signal includes a predetermined error. Alternatively, an error may be given to an output signal of the signal generation unit by using a noise source provided in the signal generation unit. As for other components included in the communication apparatus R1, they may be implemented by either a hardware implementation technique or a software implementation technique. Further, for each component included in the later-described communication apparatus S1, it may be implemented by either a hardware implementation technique or a software implementation technique.

In this embodiment, the signal generation unit R11 is implemented as a physically unclonable function unit that is a cryptographic function, and generates an output signal that can be generated from an arbitrary input signal only by that particular electronic apparatus (i.e., that particular physically unclonable function unit) by using variations that are caused when that apparatus is manufactured. The physically unclonable function included in the signal generation unit R11 is realized with an electric circuit implemented in hardware. FIG. 5 shows the cryptographic processing apparatus R10 in which the signal generation unit R11 is formed as a physically unclonable function. In this embodiment, a method for forming a physically unclonable function is not limited to any particular method, and various forming methods such as those for arbiter PUF (Physically Unclonable Function), a ring oscillator PUF, and an SRAM (Static Random Access Memory) PUF may be used.

In this embodiment, the signal generation unit R11 outputs a signal RA (also referred to as a second signal) based on the input signal X. The signal generation unit R11 does not always output the same output signal for the same input signal. That is, output signals of the signal generation unit R11 include variations in a range in which a hamming distance is equal to or smaller than a fixed value. It is assumed that the value of the signal RA, which is the output signal of the signal generation unit R11, has a sufficient length and includes a sufficient information content.

The error correction generation unit R12 receives the signal RA from the signal generation unit R11 and generates the auxiliary information A for correcting an error resulting from the variation in the signal RA for the same signal X. It is assumed that the error correction generation unit R12 is able to perform at least one of error correction code, majority calculation, high noise bit removal, and the like to generate the auxiliary information A. Further, the error correction generation unit R12 may use a combination of these algorithms. The error correction generation unit R12 outputs the auxiliary information A for correcting an error and a signal RB (also referred to as a third signal). The error correction generation unit R12 can externally receive a public random number Y in addition to the signal RA from the signal generation unit R11. Note that depending on the specification of the error correction generation unit R12, the signals RB and RA may have the same value.

Note that various configurations for implementing error correction techniques such as those using a code offset technique using error correction code or a syndrome technique, a fuzzy extractor such as a technique using a cryptographic method using decryption infeasibility of a lattice vector problem, and modified techniques thereof may be used as the error correction generation unit R12, provided that appropriate parameters corresponding to the output characteristic of the signal generation unit R11 can be selected.

The random-number extraction unit SR1 and the data separation unit SR2 constitute a private-key generation unit SR10 (a first private-key generation unit). The private-key generation unit SR10 generates a private key based on the signal RB.

The random-number extraction unit SR1 is an apparatus that receives the signal RB, which is a bit string including a bias, and outputs a signal RC (also referred to as a fifth signal) which has a value that is obtained by compressing an information content and cannot be distinguished from a truly random number. The random-number extraction unit SR1 generates the signal RC by using an appropriate secret key encryption, a message authentication code, a universal one-way hash function, or the like.

The data separation unit SR2 separates the input signal RC into a number of values according to a determined specification. In this embodiment, the data separation unit SR2 separates a signal RD (also referred to as a first private key) which is a private key used for encrypting a signal RZ to be transmitted from the signal RC and outputs the separated signal RD to the encryption calculation unit R13. It is assumed that when a value in which a part of an output is not a bit string is necessary, the data separation unit SR2 performs an appropriate process and outputs a value in a defined range. For example, when a part of an output needs to be smaller than a prime number p, the data separation unit SR2 may perform calculation such as remainder calculation using the prime number p.

The encryption calculation unit R13 encrypts the signal RZ, which is the signal to be transmitted, by using the signal RD output from the data separation unit SR2 and outputs the encrypted signal to the communication apparatus S1 as the encrypted signal B.

Figure 6:
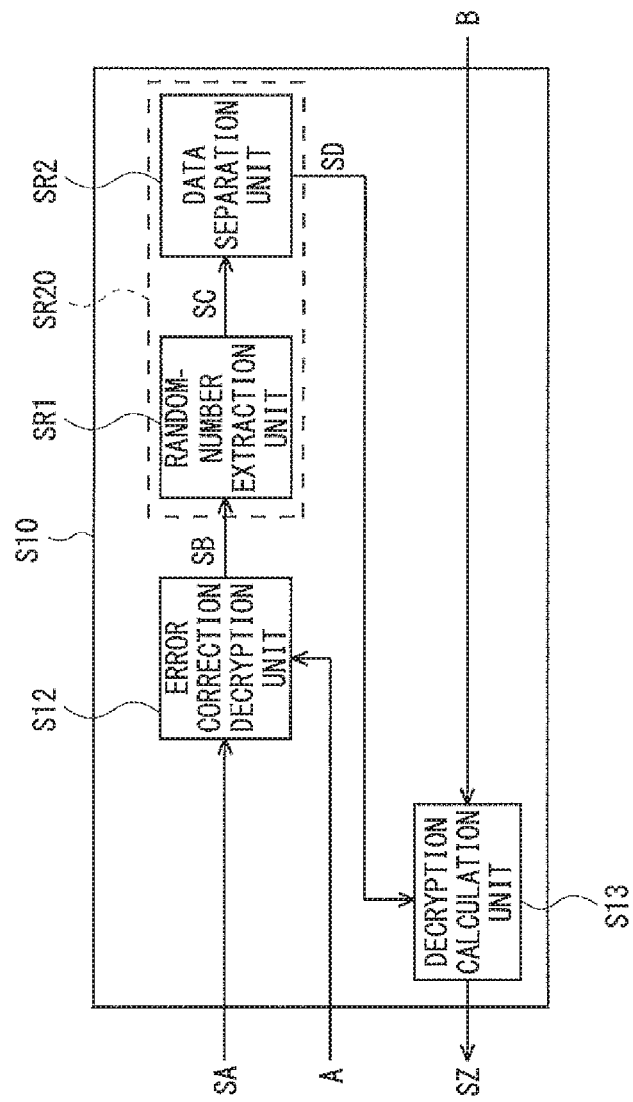
FIG. 6 schematically shows a configuration of a cryptographic processing apparatus according to the first embodiment.

Next, the cryptographic processing apparatus S10 is explained with reference to FIGS. 3 and 6. FIG. 6 schematically shows a configuration of the cryptographic processing apparatus S10 according to the first embodiment. The cryptographic processing apparatus S10 includes an error correction decryption unit S12, a random-number extraction unit SR1, a data separation unit SR2, and a decryption calculation unit S13.

The error correction decryption unit S12 corrects an error in an input value by using the auxiliary information A and outputs a signal SB (also referred to as an eighth signal). In this example, when the error correction decryption unit S12 receives the signal SA, i.e., the signal RA of the signal generation unit R11 that is stored in advance, and auxiliary information A, the error correction decryption unit S12 performs an error correction process by using them and outputs an error-corrected signal SB. It is assumed that in the error correction decryption unit S12, various numerical values in an internal algorithm necessary for error correction are determined based on an amount of noise caused by the signal generation unit R11, a correction failure rate, an information content of data to be processed, and the like.

Note that the above-described error correction generation unit R12 and the error correction decryption unit S12 may include various processes such as a majority method and removal for a part including a lot of noises in addition to the error correction code.

Note that various configurations for implementing error correction techniques such as those using a code offset technique using error correction code or a syndrome technique, a fuzzy extractor such as a technique using a cryptographic method using decryption infeasibility of a lattice vector problem, and modified techniques thereof may be used as the error correction decryption unit S12, provided that appropriate parameters corresponding to the output characteristic of the signal generation unit R11 can be selected.

The random-number extraction unit SR1 and the data separation unit SR2 constitute a private-key generation unit SR20 (a second private-key generation unit). The private-key generation unit SR20 generates a private key based on the signal SB. The random-number extraction unit SR1 and the data separation unit SR2 are similar to those of the cryptographic processing apparatus R10.

In the cryptographic processing apparatus S10, the random-number extraction unit SR1 outputs a signal SC having a value that is obtained by compressing an information content of the signal SB and cannot be distinguished from a truly random number. The data separation unit SR2 separates the signal SC into a number of values according to a determined specification. In this embodiment, the data separation unit SR2 separates a signal SD (also referred to as a fourth private key), which is a private key necessary for a process for decrypting the encrypted signal B from the signal SC, and outputs the separated signal SD to the decryption calculation unit S13. The decryption calculation unit S13 decrypts the received encrypted signal B by using the signal SD of the data separation unit SR2 and outputs the decrypted signal as a signal SZ.

Next, the length of each of the above-described signals is examined. To ensure the security of cryptographic communication between communication apparatuses, the below-described constraints are imposed on the lengths of bit strings of respective signals.

[Signal RA]

For the length of a bit string of the signal RA, it is assumed that a value obtained by subtracting a leakage of a partial information content by the auxiliary information A from an information content of the signal RA is sufficiently larger than the length of the signal RB.

[Signal RB]

For the length of a bit string of the signal RB, it is assumed that an information content of the signal RB is sufficiently larger than the length of a bit string of the signal RC. Further, it is assumed that when signals RC that are generated by performing cryptographic processing apparatus R10 multiple times are compared to each other, the signal RB includes a variation that is evaluated as an independent random number.

[Signal RD and Signal SD]

It is assumed that the lengths of bit strings of the signal RD input to the encryption calculation unit R13 and the signal SD input to the decryption calculation unit S13 are longer than a bit string of the signal RZ which is a signal to be sent.

[Signal X]

It is assumed that for the length of a bit string of the signal X, a length that is sufficient to obtain the signal RA output from the signal generation unit R11 is given.

[Prime Number p]

It is assumed that the length of a bit string of the prime number p is given based on a criterion for ensuring the security and the integrity of data. For example, the length of the prime number p is preferably 256 bits or longer.

Next, the security of cryptographic communication in this configuration is examined. When cryptographic communication between the communication apparatuses R1 and S1 has been correctly performed and a noise in the signal RA output from the signal generation unit R11 has been correctly corrected by the error correction decryption unit S12, the signal SA having a fixed value stored in the communication apparatus S1 is correctly corrected to the signal RA.

In this case, the signal SD in the communication apparatus S1 becomes identical to the signal RD in the communication apparatus R1. As a result, the signal SZ in the communication apparatus S1 becomes identical to the signal RZ in the communication apparatus R1.

Whenever the signal X is input, a value including a noise is output as the signal RA from the signal generation unit R11 of the communication apparatus R1. Therefore, when the bit string of the signal RA is sufficiently long, a signal RA that is generated at a given time point is not identical to a signal RA that was generated earlier than that time point. Further, assuming that a signal RA output at each time point includes sufficient entropy, the signal RC output from the random-number extraction unit SR1 of the communication apparatus R1 becomes a random number that is secure in terms of cryptography. Therefore, the signal RD can be used as a one-time unpredictable private key.

As explained so far, in this configuration, a physically unclonable function is used as a technique for dynamically generating a private key that is used for encryption and decryption. In general, the physically unclonable function is used to derive a private key having a fixed value. In contrast, in this configuration, it is assumed that every time a signal X, which is a fixed input value, is input, an output signal of the signal generation unit, which is formed as a physically unclonable function unit, includes a different noise. By outputting an independent random number by using the noise source in this way, a different private key is generated. Therefore, in this configuration, since it is possible to use a private key that is not a fixed value because of a variation in the error included in the signal RA, it is possible to perform highly-secure data transmission compared to data transmission using a fixed secret key.

Currently, quantum computers are actively studied and new proposals are being made in many research institutes. Further, quantum computers capable of specific calculation are already on the market. Meanwhile, it has been proved that if a quantum computer appears, secret-key cryptography such as an existing AES and public-key cryptography based on difficulty of prime factorization or a discrete logarithm problem can be easily cracked. Therefore, it is considered that the development of a cryptographic technique resilient to a quantum computer is essential for securing semiconductor business in the future.

Regarding public-key cryptography, various results have been published in recent years. However, there are a lot of problems with respect to the calculation time and scale of implementation, and hence it is expected that it is very difficult to install it in a semiconductor device in view of the cost in many cases. In contrast to this, a secret-key cryptographic method using a physically unclonable function according to this configuration can sufficiently reduce the calculation time and the implementation cost.

Further, when a classical cryptographic technique is used, it is necessary to securely keep a private key. However, there is a possibility that a private key can be picked out by using a technique in which information stored in a nonvolatile memory is physically duplicated by using a reverse engineering technique or the like. In contrast to this, in this configuration, since the physically unclonable function is used, there is no need to store secret information in a nonvolatile memory inside the apparatus, in particular, inside the communication apparatus R1. Therefore, it can be understood that this configuration has a high security property because the risk that the private key can be stolen can be avoided. Further, since no secret information is stored in the communication apparatus that sends an encrypted signal, it is possible to prevent secret information leakage even when the communication apparatus that sends the encrypted signal is identified.

Figure 7:
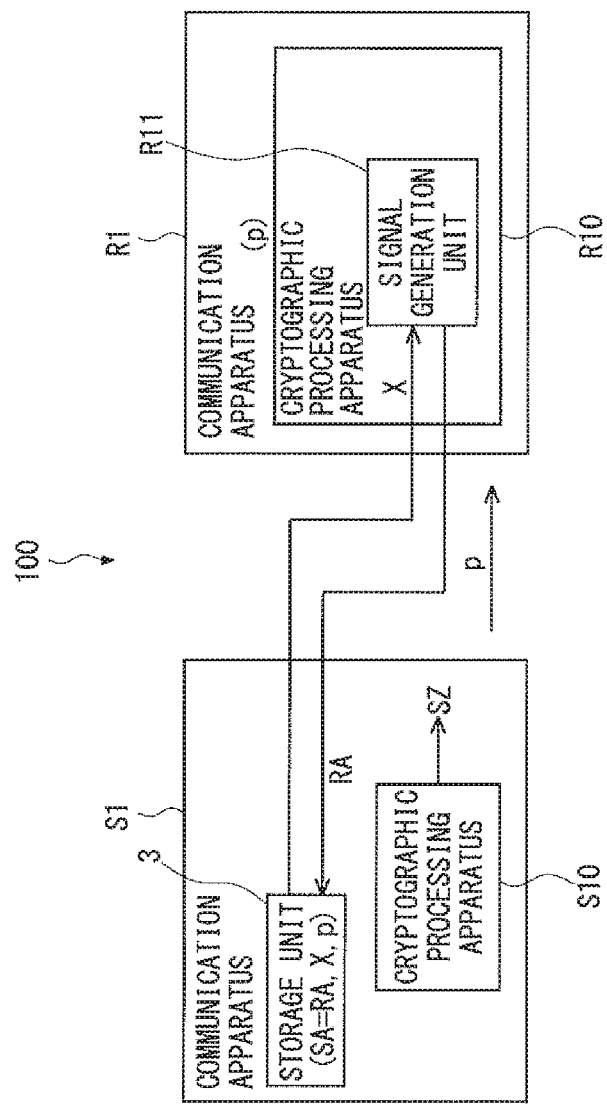
FIG. 7 shows flows of signals in initialization of the cryptographic processing system according to the first embodiment.

An initialization method for the signal SA and the signal X stored in the storage unit 3 of the communication apparatus S1 is explained hereinafter. FIG. 7 shows flows of signals in initialization of the cryptographic processing system 100 according to the first embodiment. This initialization is performed in an environment in which no outsider is monitoring the process.

Firstly, the communication apparatus S1 generates a random number by, for example, a random-number generator (not shown) and outputs the generated random number to the communication apparatus R1 as a signal X. Further, the communication apparatus S1 outputs an arbitrary prime number p to the communication apparatus R1. The communication apparatus R1 stores the prime number p into a storage unit (not shown). The prime number p is used as required in processes performed by the communication apparatuses R1 and S1. Note that illustration of the prime number p is omitted in the drawings that are referred to in this explanation.

The communication apparatus R1 supplies the signal X to the signal generation unit R11 and outputs a signal RA, which is an output of the signal generation unit R11, to the communication apparatus S1. The communication apparatus S1 substitutes the received signal RA for the signal SA. Then, the communication apparatus S1 stores the updated signal SA, the signal X, and the prime number p into the storage unit 3.

As explained above, the signal SA and the signal X are defined through the initialization. After completing this initialization, it is possible to perform the above-described secure data communication.

Second Embodiment

Figure 8:
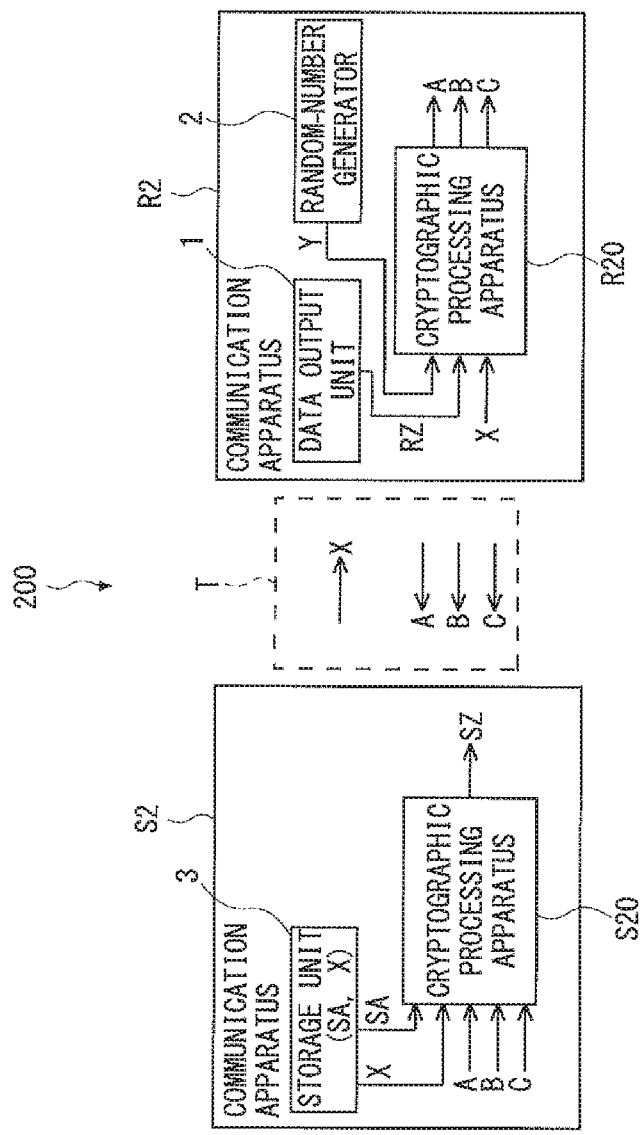
FIG. 8 schematically shows a configuration of a cryptographic processing system according to a second embodiment.

A cryptographic processing system 200 according to a second embodiment is explained. FIG. 8 schematically shows a configuration of the cryptographic processing system 200 according to the second embodiment. The cryptographic processing system 200 according to the second embodiment has a configuration obtained by replacing the communication apparatuses R1 and S1 of the cryptographic processing system 100 according to the first embodiment by communication apparatuses R2 and S2, respectively. The communication apparatus R2 has a configuration obtained by replacing the cryptographic processing apparatus R10 of the communication apparatus R1 with a cryptographic processing apparatus R20. The communication apparatus S2 has a configuration obtained by replacing the cryptographic processing apparatus S10 of the communication apparatus S1 with a cryptographic processing apparatus S20.

Figure 9:
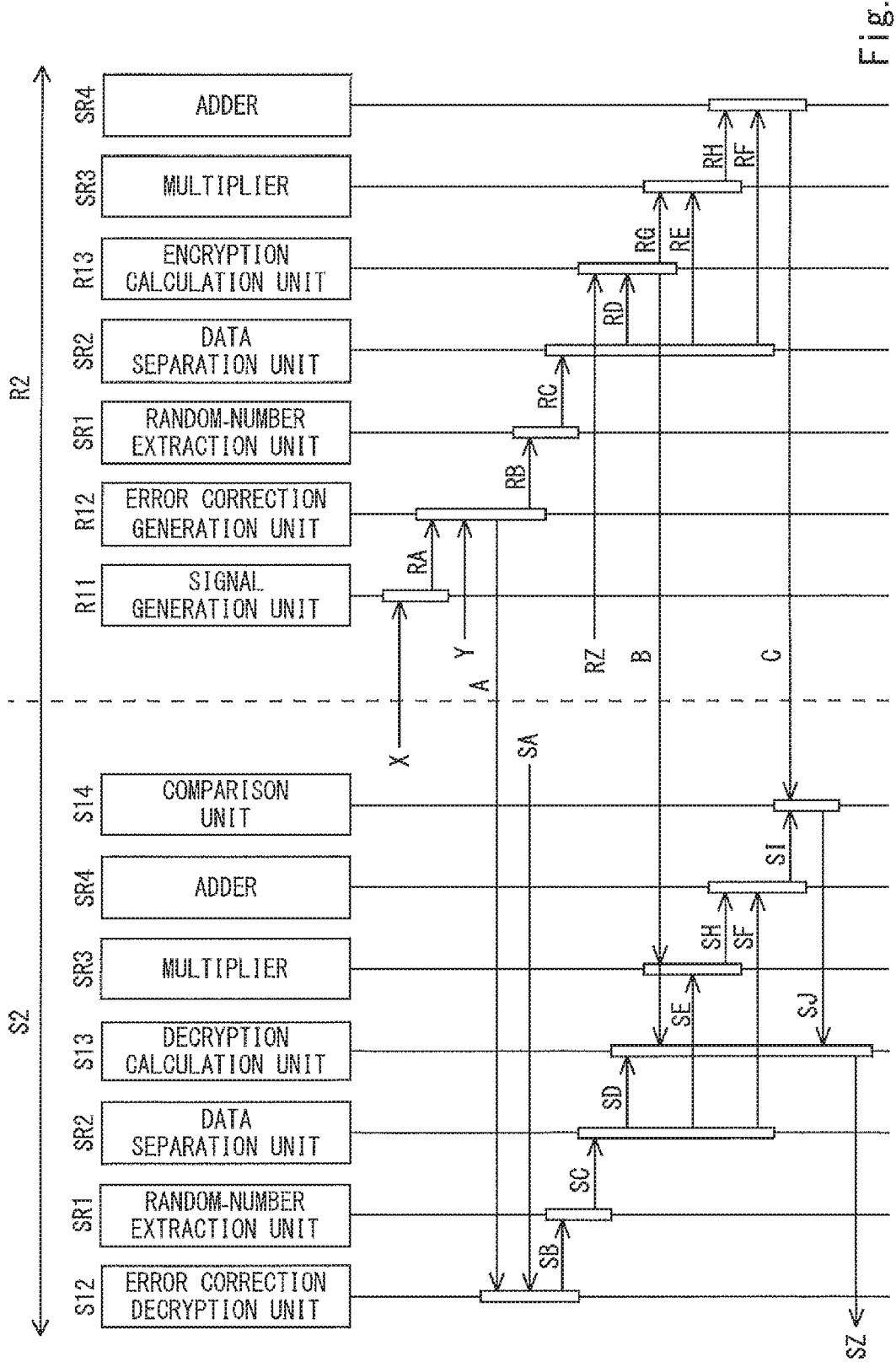
FIG. 9 is a sequence diagram showing exchanges of signals in the cryptographic processing system according to the second embodiment.
Figure 10:
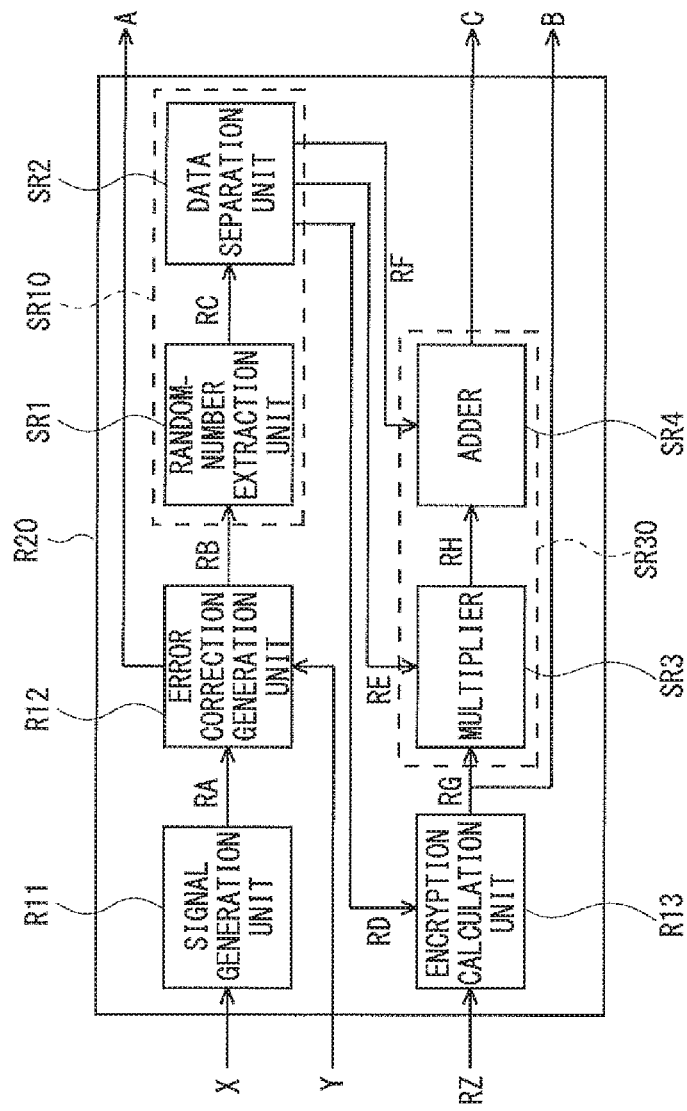
FIG. 10 schematically shows a configuration of a cryptographic processing apparatus according to the second embodiment.
Figure 11:
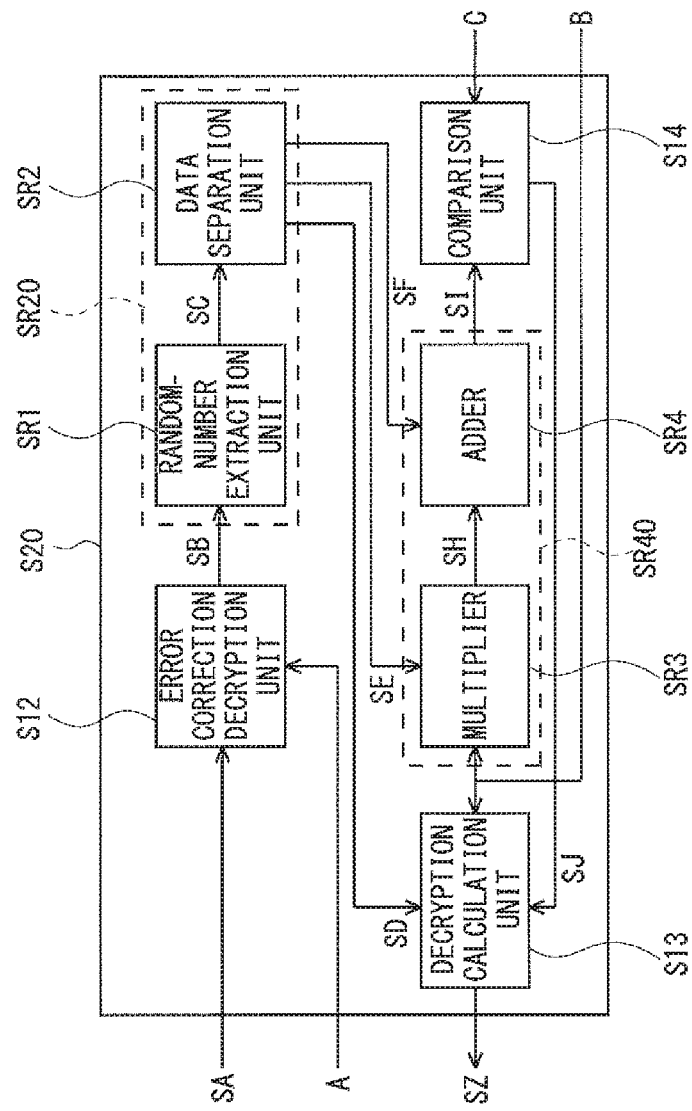
FIG. 11 schematically shows a configuration of a cryptographic processing apparatus according to the second embodiment.

A configuration and an operation of each part of the cryptographic processing system 200 are explained hereinafter with reference to FIGS. 9 to 11. FIG. 9 is a sequence diagram showing exchanges of signals in the cryptographic processing system 200 according to the second embodiment.

The cryptographic processing apparatus R20 is explained with reference to FIGS. 9 and 10. FIG. 10 schematically shows a configuration of the cryptographic processing apparatus R20 according to the second embodiment. The cryptographic processing apparatus R20 has a configuration obtained by adding a multiplier SR3 and an adder SR4 in the cryptographic processing apparatus R10.

The multiplier SR3 and the adder SR4 constitute an authentication information generation unit SR30. The authentication information generation unit SR30 generates authentication information C based on the encrypted signal B (a signal RG) and a private key different from the signal RD.

In this embodiment, the data separation unit SR2 of the cryptographic processing apparatus R20 separates the input signal RC into a signal RD, a signal RE (also referred to as a second private key), and a signal RF (also referred to as a third private key). The signals RD, RE and RF are output to the encryption calculation unit R13, the multiplier SR3, and the adder SR4, respectively.

The multiplier SR3 multiplies the signal RG output from the encryption calculation unit R13 (i.e., the encrypted signal B) by the signal RE supplied from the data separation unit SR2 and outputs a value obtained from the multiplication result to the adder SR4 as a signal RH (also referred to as a sixth signal). Note that in this embodiment, it is assumed that the multiplier SR3 divides the multiplication result of the signals RG and RE by a prime number p and outputs a remainder of the division as a signal RH.

The adder SR4 adds the signal RH output from the multiplier SR3 and the signal RF supplied from the data separation unit SR2 and outputs a value obtained from the addition result to the cryptographic processing apparatus S20 of the communication apparatus S2 as authentication information C. Note that in this embodiment, it is assumed that the adder SR4 divides the addition result of the signals RH and RF by the prime number p and outputs a remainder of the division as the authentication information C.

Next, the cryptographic processing apparatus S20 is explained with reference to FIGS. 9 and 11. FIG. 11 schematically shows a configuration of the cryptographic processing apparatus S20 according to the second embodiment. The cryptographic processing apparatus S20 has a configuration obtained by adding a multiplier SR3, an adder SR4, and a comparison unit S14 in the cryptographic processing apparatus S10.

The multiplier SR3 and the adder SR4 constitute a comparison signal generation unit SR40. The comparison signal generation unit SR40 generates a comparison signal SI based on the encrypted signal B and a private key different from the signal SD. Note that the multiplier SR3 and the adder SR4 have configurations similar to those of the cryptographic processing apparatus R20.

In this embodiment, the data separation unit SR2 of the cryptographic processing apparatus S20 separates an input signal SC (also referred to as a ninth signal) into a signal SD, a signal SE (also referred to as a fifth private key), and a signal SF (also referred to as a sixth private key), which are private keys. The signals SD, SE and SF are output to the decryption calculation unit S13, the multiplier SR3, and the adder SR4, respectively.

The multiplier SR3 of the cryptographic processing apparatus S20 multiplies the encrypted signal B output from the cryptographic processing apparatus R20 by the signal SE supplied from the data separation unit SR2 and outputs a value obtained from the multiplication result to the adder SR4 as a signal SH (also referred to as a tenth signal). Note that in this embodiment, it is assumed that the multiplier SR3 divides the multiplication result of the encrypted signal B and the signal SE by the prime number p and outputs a remainder of the division as a signal SH. That is, the signal SH becomes the same signal as the signal RH in the cryptographic processing apparatus R20.

The adder SR4 of the cryptographic processing apparatus S20 adds the signal SH output from the multiplier SR3 of the cryptographic processing apparatus S20 and the signal SF supplied from the data separation unit SR2 and outputs a value obtained from the addition result to the comparison unit S14 as a comparison signal SI. Note that in this embodiment, it is assumed that the adder SR4 divides the addition result of the signals SH and SF by the prime number p and outputs a remainder of the division as the comparison signal SI.

The comparison unit S14 compares the authentication information C output from the cryptographic processing apparatus R20 with the comparison signal SI and outputs a comparison result to the decryption calculation unit S13 as a signal SJ.

Based on the signal SJ, when the authentication information C matches the comparison signal SI, the decryption calculation unit S13 decrypts the encrypted signal B into a signal SZ by using the signal SD. When the authentication information C differs from the comparison signal SI, the decryption calculation unit S13 stops the decryption of the encrypted signal B by using the signal SD. In this way, the communication apparatus S2 can perform the decryption process after it has confirmed that the encrypted signal B has not been tampered with by using the authentication information C.

The security of cryptographic communication in this configuration is examined. When cryptographic communication between the communication apparatuses R2 and S2 has been correctly performed and a noise in the signal RA output from the signal generation unit R11 has been correctly corrected by the error correction decryption unit S12, the signal SA having a fixed value stored in the communication apparatus S2 is correctly corrected to the signal RA.

In this case, the signals SD, SE and SF in the communication apparatus S2 become identical to the signals RD, RE and RF, respectively, in the communication apparatus R2. As a result, the signal SZ in the communication apparatus S2 becomes identical to the signal RZ in the communication apparatus R2.

Next, the length of each of the above-described signals is examined. To ensure the security of cryptographic communication between communication apparatuses, the below-described constraints in addition to those explained in the first embodiment are imposed on the lengths of bit strings of respective signals.

[Signal RE and Signal SE]

It is assumed that the signals RE and SE input to the multiplier SR3 have values smaller than the prime number p. This is because when the data separation unit SR2 divides the signals RC and SC supplied thereto into three signals, it can handle the division by performing remainder calculation by using the prime number p.

[Signal RF and Signal SF]

It is assumed that the signals RF and SF input to the adder SR4 have values smaller than the prime number p. This is because when the data separation unit SR2 divides the signals RC and SC supplied thereto into three signals, it can handle the division by performing remainder calculation by using the prime number p.

[Encrypted Signal B and Signal RG]

It is assumed that the encrypted signal B and the signal RG input to the multiplier SR3 have values smaller than the prime number p. This is because when the length of the bit string of the signal RZ is one bit shorter than the prime number p and the signal RG is equal to or larger than the prime number p, it can handle by reversing the most significant bit of the signal RG. Alternatively, it may handle by regenerating the signal RA output from the signal generation unit R11 until the signal RG becomes smaller than the prime number p or regenerating the signal RD by contriving the separating method performed by the data separation unit SR2.

As described so far, in this configuration, the authentication information C is used to determine genuineness of received data. In this way, it is possible to determine whether or not the received encrypted signal B has been transmitted from a legitimate transmission source. This sort of authentication method has been known as a cryptographic technique that is secure in terms of information theory. However, there is a constraint that a private key to be used can be used only once in order to ensure the security. Therefore, when a private key having a fixed value is used and data authentication using authentication information is used, the security in terms of information theory cannot be ensured.

In contrast to this, in this configuration, by using a variation in the output of the physically unclonable function, the signals SD, SE and SF can be handled as a one-time unpredictable private key. That is, a different private key can be used every time encryption is performed. Therefore, it is possible to overcome the above-described constraint related to data authentication and to apply a cryptographic technique whose security in terms of information theory is ensued.

Third Embodiment

Figure 12:
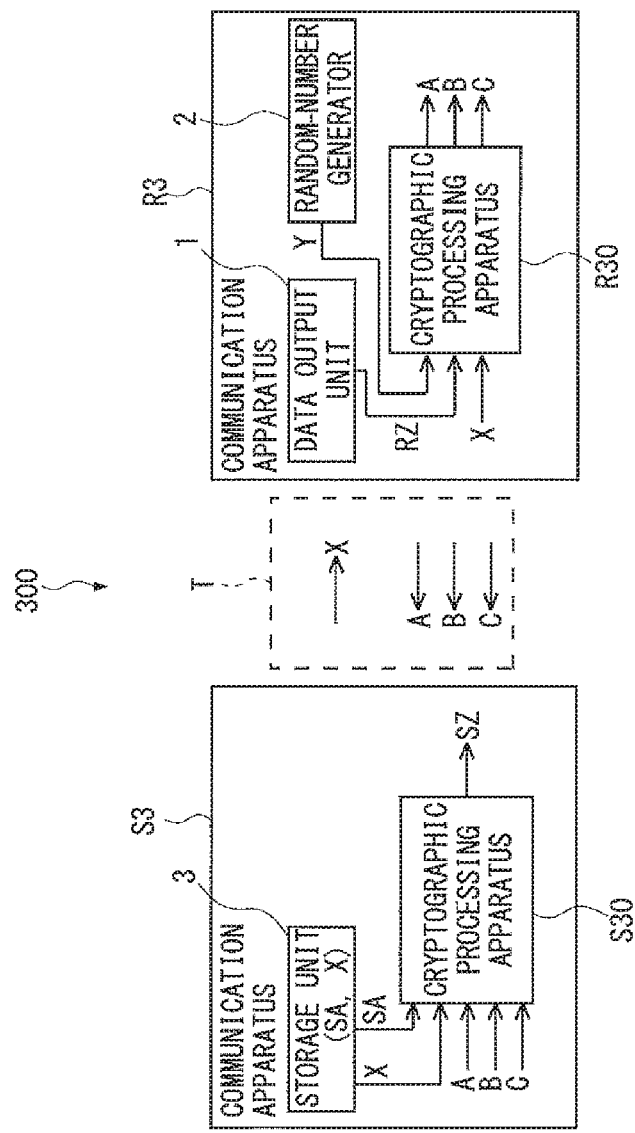
FIG. 12 schematically shows a configuration of a cryptographic processing system according to a third embodiment.

A cryptographic processing system 300 according to a third embodiment is explained. FIG. 12 schematically shows a configuration of the cryptographic processing system 300 according to the third embodiment. The cryptographic processing system 300 according to the third embodiment has a configuration obtained by replacing the communication apparatuses R1 and S1 of the cryptographic processing system 100 according to the first embodiment with communication apparatuses R3 and S3, respectively. The communication apparatus R3 has a configuration obtained by replacing the cryptographic processing apparatus R10 of the communication apparatus R1 with a cryptographic processing apparatus R30. The communication apparatus S3 has a configuration obtained by replacing the cryptographic processing apparatus S10 of the communication apparatus S1 with a cryptographic processing apparatus S30.

Figure 13:
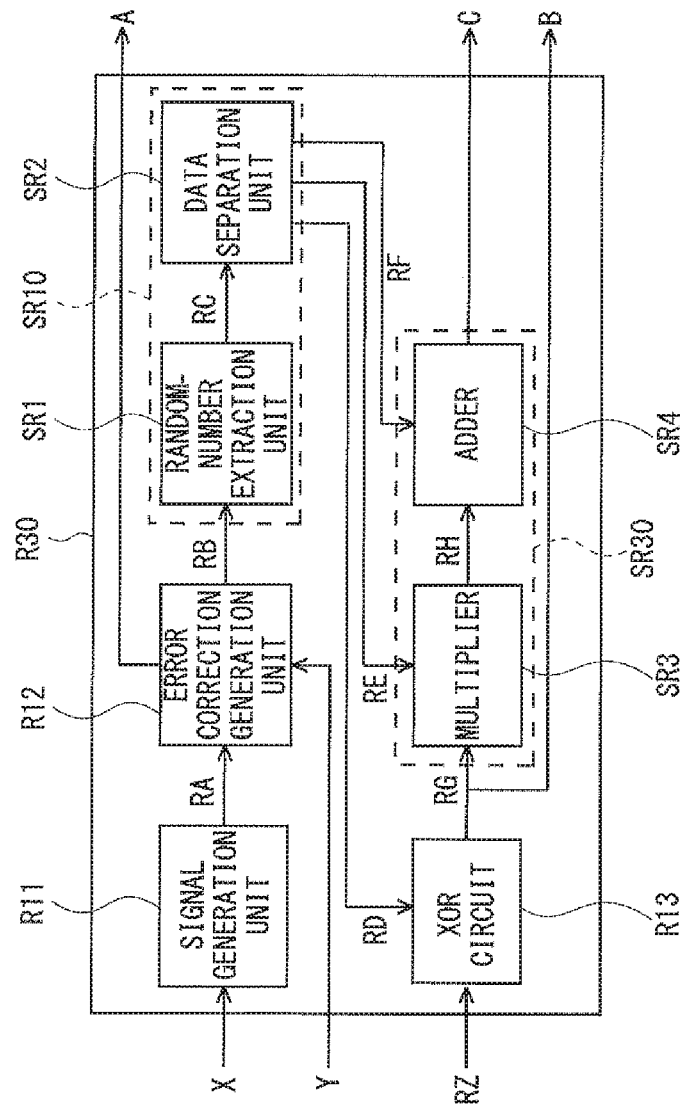
FIG. 13 schematically shows a configuration of a cryptographic processing apparatus according to the third embodiment.

The cryptographic processing apparatus R30 is explained. FIG. 13 schematically shows a configuration of the cryptographic processing apparatus R30 according to the third embodiment. The cryptographic processing apparatus R30 uses an exclusive-OR (XOR) calculation unit as the encryption calculation unit R13. The rest of the configuration of the cryptographic processing apparatus R30 is similar to that of the cryptographic processing apparatus R10 and hence its explanation is omitted.

The encryption calculation unit R13, which is formed by the XOR calculation unit, outputs an exclusive-OR of the signal RD output from the data separation unit SR2 and the signal RZ, which is the signal to be transmitted, to the communication apparatus S3 as an encrypted signal B (i.e., as a signal RG).

Figure 14:
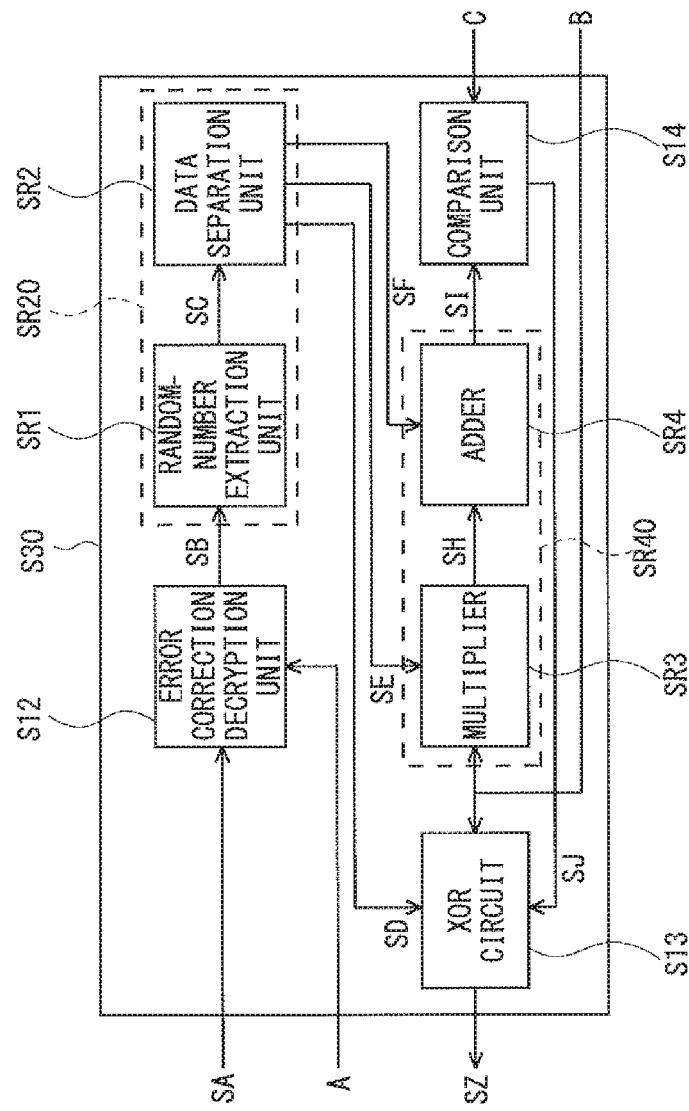
FIG. 14 schematically shows a configuration of a cryptographic processing apparatus according to the third embodiment.

The cryptographic processing apparatus S30 is explained. FIG. 14 schematically shows a configuration of the cryptographic processing apparatus S30 according to the third embodiment. The cryptographic processing apparatus S30 uses an exclusive-OR (XOR) calculation unit as the decryption calculation unit S13. The rest of the configuration of the cryptographic processing apparatus S30 is similar to that of the cryptographic processing apparatus S10 and hence its explanation is omitted.

The decryption calculation unit S13, which is formed by the XOR calculation unit, decrypts the encrypted signal B by calculating an exclusive-OR of the signal SD output from the data separation unit SR2 and the encrypted signal B, and output the decrypted signal as a signal SZ.

In this embodiment, it is possible to form the encryption calculation unit R13 of the cryptographic processing apparatus R30 and the decryption calculation unit S13 of the cryptographic processing apparatus S30 by using the XOR calculation units having identical configurations.

As explained so far, in this configuration, exclusive-OR calculation is performed when data is encrypted. Generation of a cryptogram by exclusive-OR calculation has been known as a cryptographic technique that is secure in terms of information theory. However, there is a constraint that a private key to be used can be used only once in order to ensure the security. Therefore, when a private key having a fixed value is used and exclusive-OR calculation is used, the security in terms of information theory cannot be ensured.

In contrast to this, in this configuration, by using a variation in the output of the physically unclonable function, the signals SD, SE and SF can be handled as a one-time unpredictable private key. That is, a different private key can be used every time encryption is performed. Therefore, it is possible to overcome the constraint related to cryptographic generation using exclusive-OR calculation and to apply a cryptographic technique whose security in terms of information theory is ensued.

Fourth Embodiment

Figure 15:
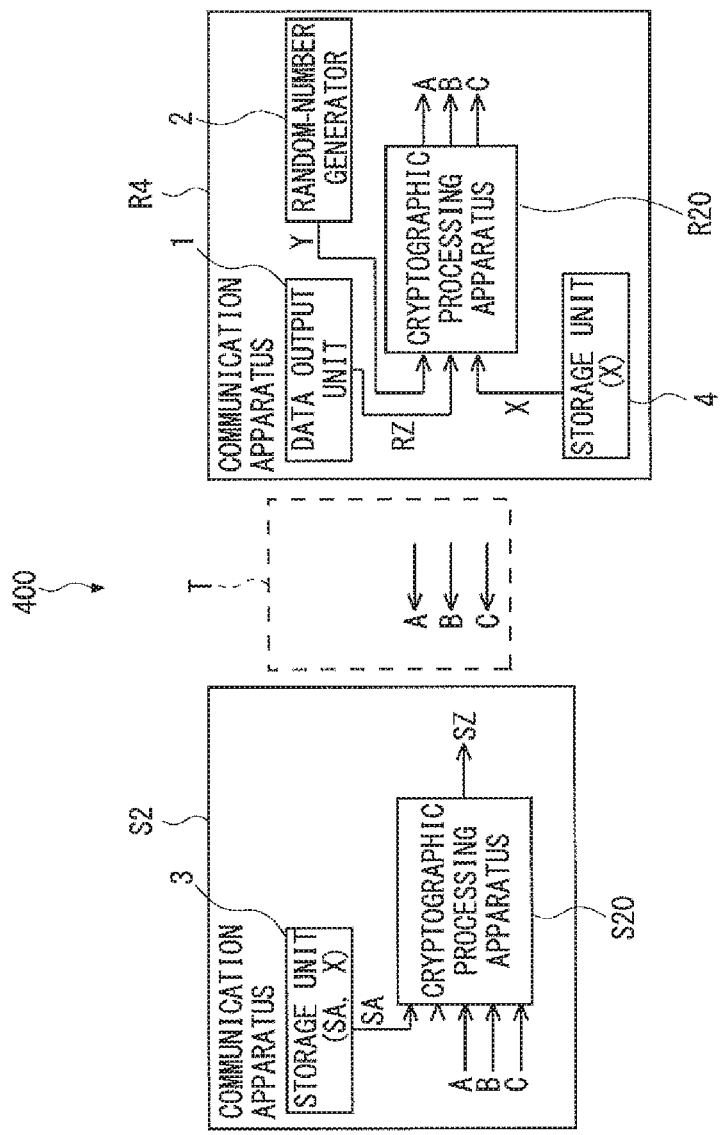
FIG. 15 schematically shows a configuration of a cryptographic processing system according to a fourth embodiment.

A cryptographic processing system 400 according to a fourth embodiment is explained. FIG. 15 schematically shows a configuration of the cryptographic processing system 400 according to the fourth embodiment. The cryptographic processing system 400 according to the fourth embodiment has a configuration obtained by replacing the communication apparatus R2 of the cryptographic processing system 200 with a communication apparatus R4.

Figure 16:
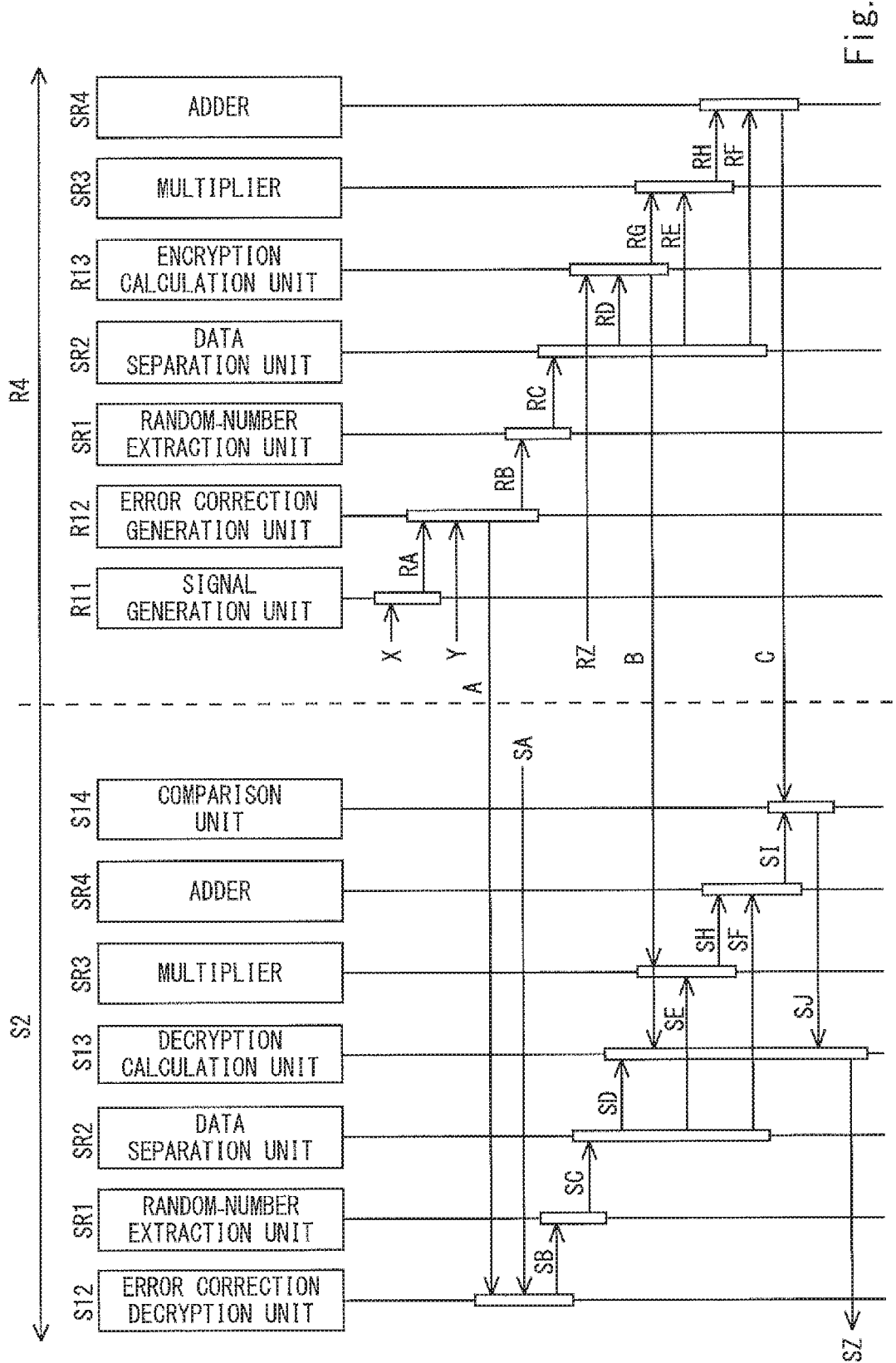
FIG. 16 showing exchanges of signals in the cryptographic processing system according to the fourth embodiment.

FIG. 16 shows exchanges of signals in the cryptographic processing system 400 according to the fourth embodiment. In the cryptographic processing system 200, the signal X is transmitted from the communication apparatus S2 to the communication apparatus R2. In contrast to this, the cryptographic processing system 400 has a configuration different from that of the cryptographic processing system 200 in that the signal X is not transmitted from the communication apparatus S2 to the communication apparatus R4. Instead, the communication apparatus R4 stores the signal X in advance.

The communication apparatus R4 is explained. The communication apparatus R4 has a configuration obtained by adding a storage unit 4 (also referred to as a first storage unit) in the communication apparatus R2. The signal X is stored in advance in the storage unit 4. The signal X is supplied to the signal generation unit R11 of the cryptographic processing apparatus R20 as the need arises. In this way, the communication apparatus R4 can perform an operation similar to that of the communication apparatus R2.

According to this configuration, the communication apparatus R4 can proceed with the process necessary for cryptographic communication at an arbitrary time without waiting for the transmission of the signal X from the communication apparatus S1. Therefore, use of the communication apparatus R4 according to this embodiment is preferred to use of the communication apparatus R2 according to the second embodiment for communication between communication apparatuses in which communication delays occur.

Fifth Embodiment

Figure 17:
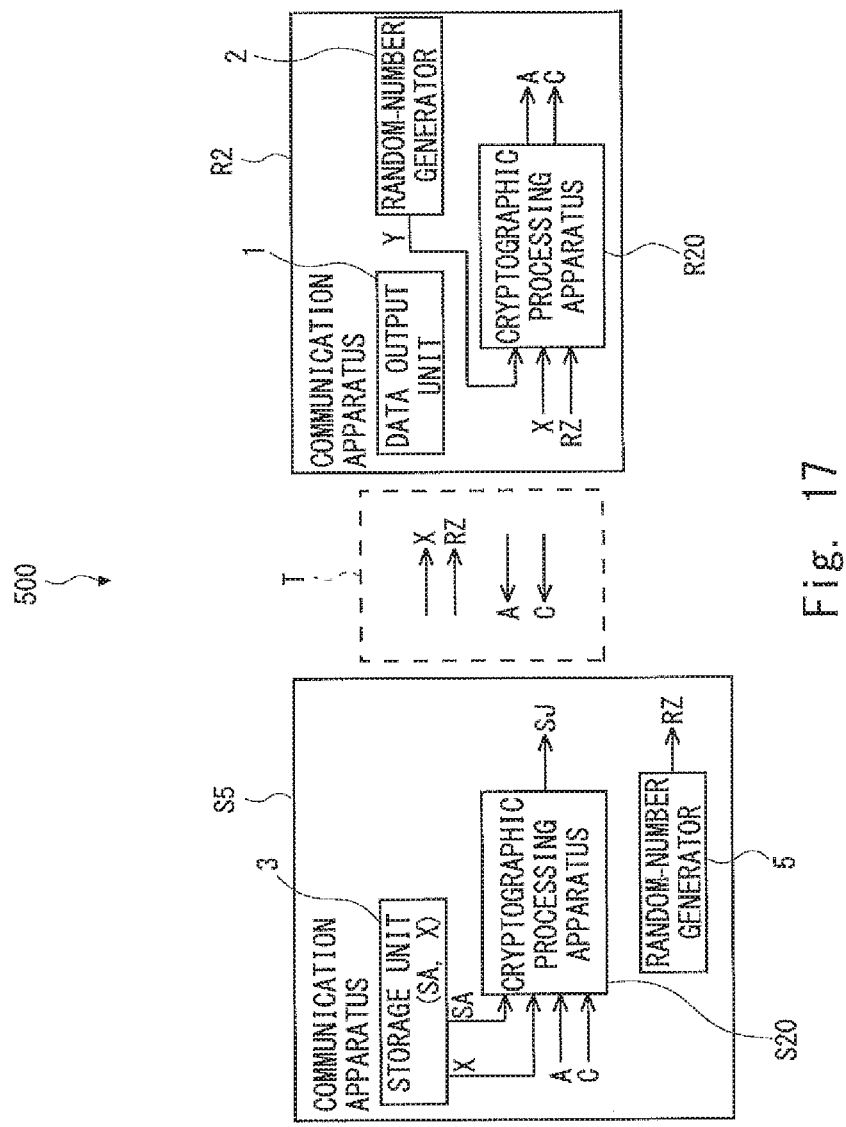
FIG. 17 schematically shows a configuration of a cryptographic processing system according to a fifth embodiment.

A cryptographic processing system 500 according to a fifth embodiment is explained. FIG. 17 schematically shows a configuration of the cryptographic processing system 500 according to the fifth embodiment. The cryptographic processing system 500 according to the fifth embodiment has a configuration obtained by replacing the communication apparatus S2 of the cryptographic processing system 200 with a communication apparatus S5. The communication apparatus S5 has a configuration obtained by adding a random-number generator 5 in the communication apparatus S2.

Figure 18:
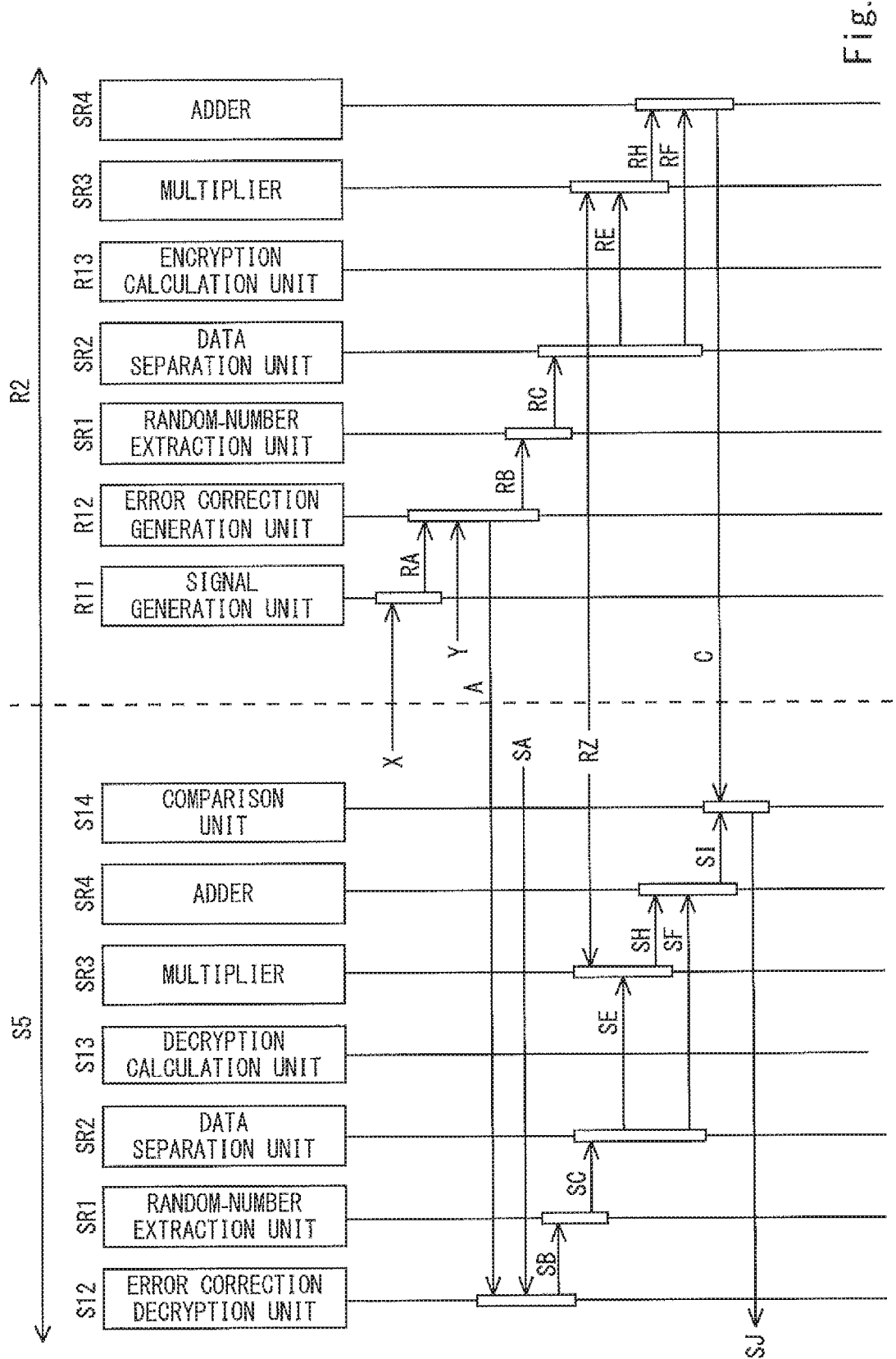
FIG. 18 showing exchanges of signals in the cryptographic processing system according to the fifth embodiment.

FIG. 18 shows exchanges of signals in the cryptographic processing system 500 according to the fifth embodiment. In the cryptographic processing system 500, similarly to the communication apparatus S2, the communication apparatus S5 outputs the signal X to the communication apparatus R2. Further, the communication apparatus S5 outputs a random number generated by the random-number generator 5 to the communication apparatus R2 as a signal RZ.

In this embodiment, the signal RZ is input to the multiplier SR3 while bypassing (i.e., without passing through) the encryption calculation unit R13. Since the signal RZ is not input to the encryption calculation unit R13, the communication apparatus R2 does not output the encrypted signal B. However, similarly to the second embodiment, the communication apparatus R2 outputs auxiliary information A and authentication information C to the communication apparatus S5.

In this embodiment, the signal RZ is supplied from the random-number generator 5 to the multiplier SR3 of the communication apparatus S5. The comparison unit S14 compares a comparison signal SI generated based on the signal RZ with the authentication information C and outputs a comparison result as a signal SJ.

According to this configuration, when the authentication information C matches the comparison signal SI generated based on the signal RZ, it is possible to ensure that the communication apparatus R2, which has generated the authentication information C, is legitimate as an entity with which the communication apparatus S5 performs cryptographic communication.

That is, when the noise of the physically unclonable function is sufficiently small and is correctly removed by the error correction decryption unit S12, and communication between communication apparatuses is not tampered with, the communication apparatus S5 can correctly authenticate the communication apparatus R2. Note that it can be understood that the probability of succeeding in authentication in cases other than the aforementioned case exponentially decreases according to the lengths of the auxiliary information A and the authentication information C.

Sixth Embodiment

Figure 19:
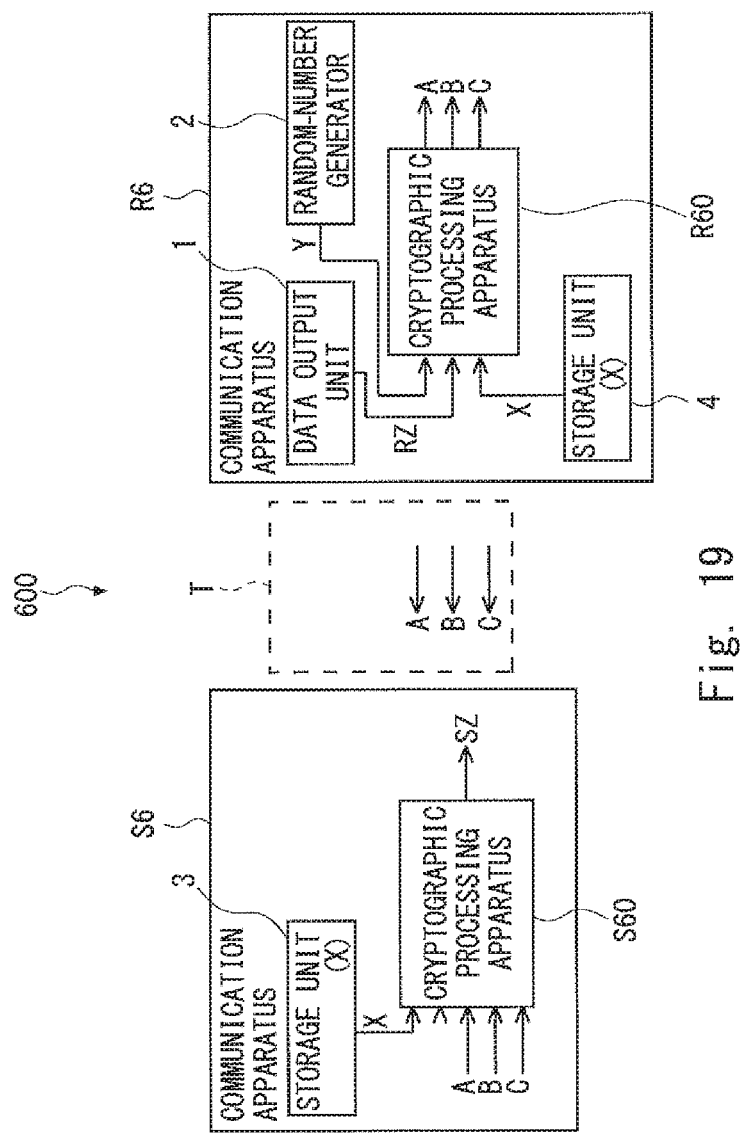
FIG. 19 schematically shows a configuration of a cryptographic processing system according to a sixth embodiment.

A cryptographic processing system 600 according to a sixth embodiment is explained. FIG. 19 schematically shows a configuration of the cryptographic processing system 600 according to the sixth embodiment. The cryptographic processing system 600 is a modified example of the cryptographic processing system 400 and has a configuration obtained by replacing the communication apparatuses S2 and R4 of the cryptographic processing system 400 with communication apparatuses S6 and R6, respectively.

The communication apparatus R6 has a configuration obtained by replacing the cryptographic processing apparatus R20 of the communication apparatus R4 with a cryptographic processing apparatus R60 and adding a storage unit 4 in which the signal X is stored as in the case of the cryptographic processing system 400 according to the fourth embodiment. In this way, in the cryptographic processing system 600, similarly to the cryptographic processing system 400, the signal X is not transmitted from the communication apparatus S6 to the communication apparatus R6 but is stored in advance in the storage unit 4 in the communication apparatus R6. Therefore, the signal X is supplied from the storage unit 4 to the cryptographic processing apparatus R60. The storage unit 4 is similar to that in the cryptographic processing system 400.

The communication apparatus S6 has a configuration obtained by replacing the cryptographic processing apparatus S20 of the communication apparatus S2 by a cryptographic processing apparatus S60. Further, unlike the first to fifth embodiments, the signal SA is not stored in the communication apparatus S6.

Figure 20:
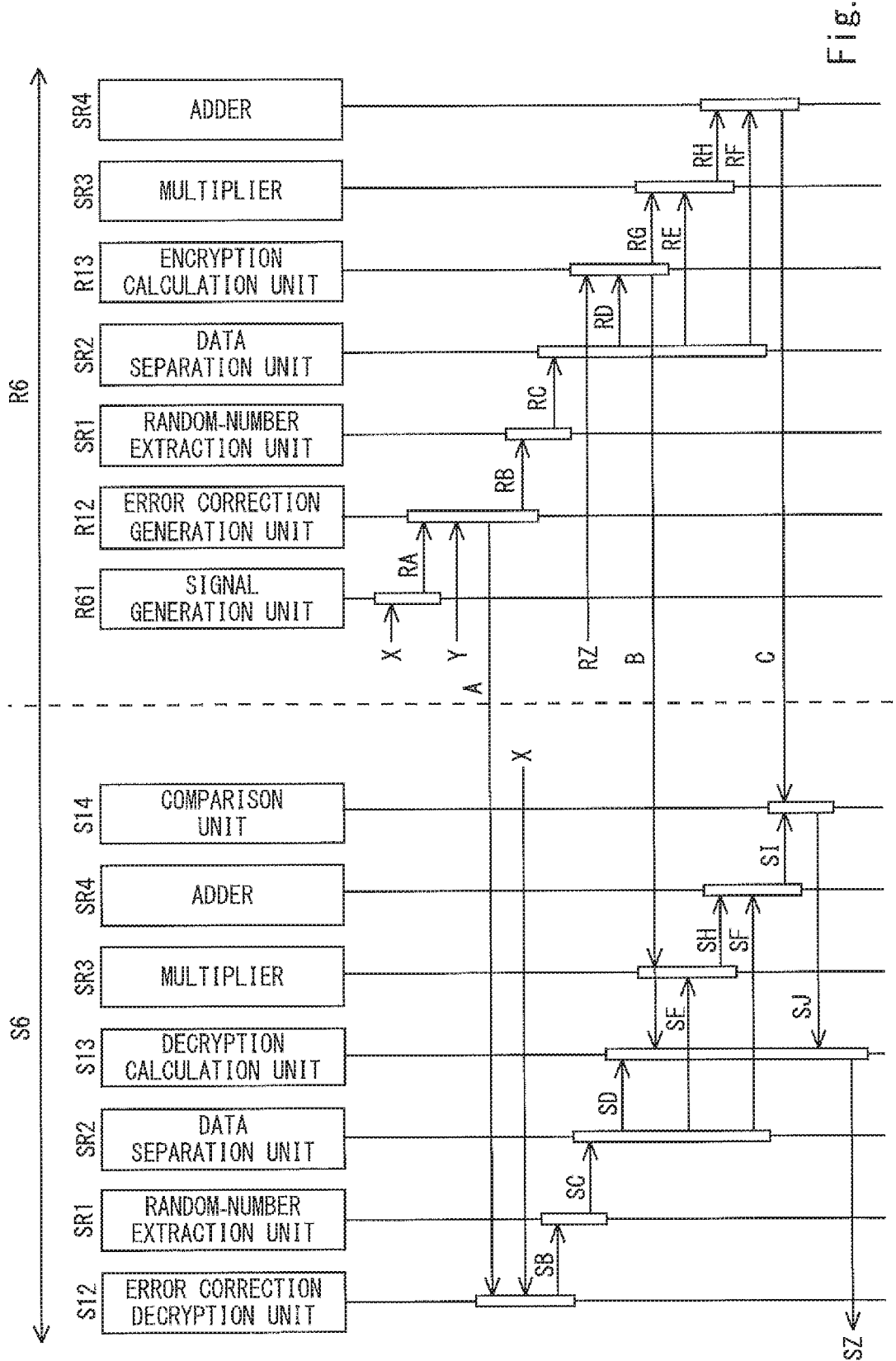
FIG. 20 showing exchanges of signals in the cryptographic processing system according to the sixth embodiment.
Figure 21:
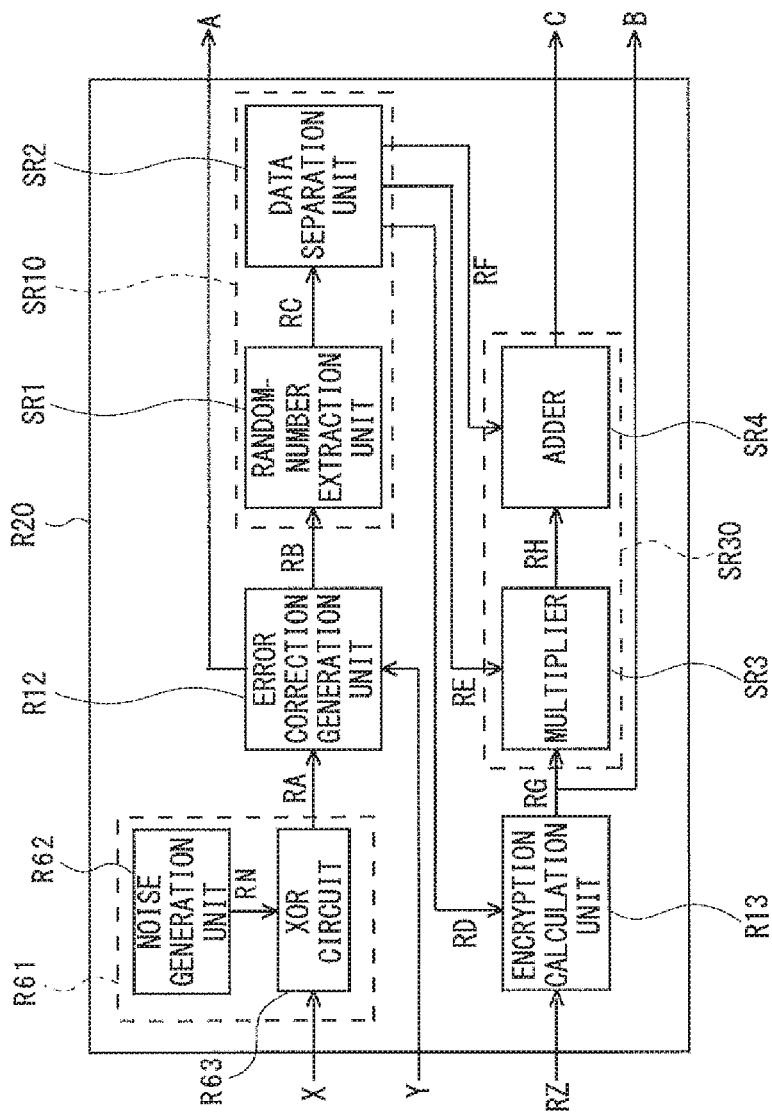
FIG. 21 schematically shows a configuration of a cryptographic processing apparatus according to the sixth embodiment.

A configuration and an operation of each part of the cryptographic processing system 600 are explained hereinafter. FIG. 20 shows exchanges of signals in the cryptographic processing system 600 according to the sixth embodiment. FIG. 21 schematically shows a configuration of the cryptographic processing apparatus R60 according to the sixth embodiment. Unlike the cryptographic processing apparatus R20, the cryptographic processing apparatus R60 has a configuration in which the signal generation unit is not formed as a physically unclonable function (PUF) unit but includes a noise generation unit.

The signal generation unit R61 of the cryptographic processing apparatus R60 includes a noise generation unit R62 and an XOR circuit R63. The noise generation unit R62 generates a noise RN having a variation in a predetermined range and supplies the generated noise RN to the XOR circuit R63. As described above, the signal X is stored in advance in the storage unit 4 and is supplied from the storage unit 4 to the XOR circuit R63.

The XOR circuit R63 outputs an exclusive-OR of the input signal X and the noise RN as a signal RA, which is an output signal. Note that in the signal generation unit R61, the same output signal is not always output for the same input signal. That is, the noise RN is generated by the noise generation unit R62 so that variations occur in output signals in a range in which a hamming distance is equal to or smaller than a fixed value. In this way, the signal generation unit R61 can achieve behavior similar to that of the signal generation unit using the physically unclonable function as in the case of the first to fifth embodiments and can output the signal RA similar to that output by the signal generation unit using the physically unclonable function.

The noise generation unit R62 is preferably configured so that noises (errors) comparative to those generated when the physically unclonable function is used are generated. For example, in the case where noises are generated in such a level that $2^{256}$ possible variations occur in the signal RA, when the possibility of an occurrence of a noise is 1%, the necessary length of the signal X is 3,300 bits. Further, when the possibility of an occurrence of a noise is 10%, the necessary length of the signal X is 560 bits. The noise generation unit R62 can be formed by using an arbitrary noise source that can be implemented by hardware or software, such as a noise generation unit using thermal noises and a TRNG (Truly Random-Number Generator), provided that generated noises are unpredictable.

The signal RA, which is the exclusive-OR of the signal X and the noise RN, is input to the error correction generation unit R12. Similarly to the above-described embodiments, the error correction generation unit R12 generates auxiliary information A for correcting an error resulting from the variation in the signal RA for the same signal X and outputs the generated auxiliary information A and a signal RB (also referred to as a third signal). The error correction generation unit R12 can externally receive a public random number Y in addition to the signal RA from the signal generation unit R61. Note that depending on the specification of the error correction generation unit R12, the signals RB and RA may have the same value.

The rest of the configuration and the operation of the cryptographic processing apparatus R60 are similar to those of the cryptographic processing apparatus R10 and hence their explanations are omitted.

Figure 22:
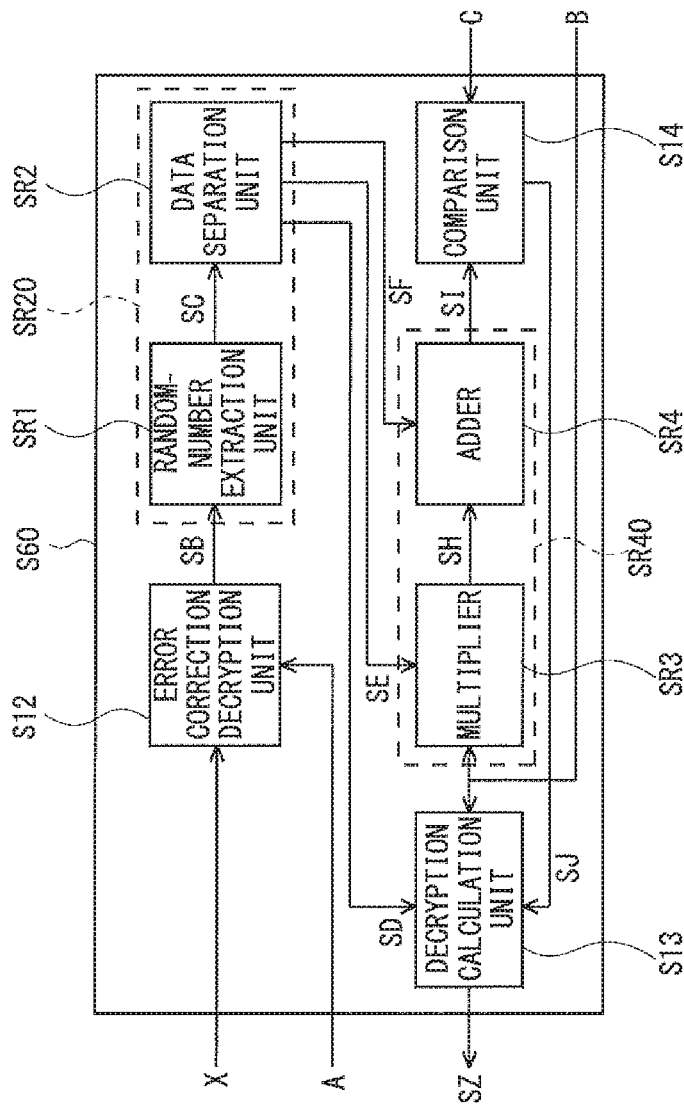
FIG. 22 schematically shows a configuration of a cryptographic processing apparatus according to the sixth embodiment.

Next, the cryptographic processing apparatus S60 is explained. FIG. 22 schematically shows a configuration of the cryptographic processing apparatus S60 according to the sixth embodiment. In the cryptographic processing apparatus S60, unlike the first to fifth embodiments, instead of the signal SA, the signal X is supplied from the storage unit 3 to the error correction decryption unit S12. The error correction decryption unit S12 can restore the signal RA, which is the exclusive-OR of the signal X and the noise RN, by using the signal X and the auxiliary information A. Then, a signal SB can be output based on the restored signal RA. Note that similarly to the above-described embodiments, when the signal RA is correctly restored, the signal SB becomes the same signal as the signal RB. The rest of the configuration and the operation of the cryptographic processing apparatus S60 are similar to those of the cryptographic processing apparatus S10 and hence their explanations are omitted.

According to this configuration, the communication apparatus R6 can proceed with the process necessary for cryptographic communication at an arbitrary time without waiting for the transmission of the signal X from the communication apparatus S6. Therefore, the cryptographic processing system 600 according to this embodiment is preferably used for communication between communication apparatuses in which communication delays occur. Further, even when implementation of a physically unclonable function unit is very difficult, a comparative cryptographic processing system can be formed.

Seventh Embodiment

Figure 23:
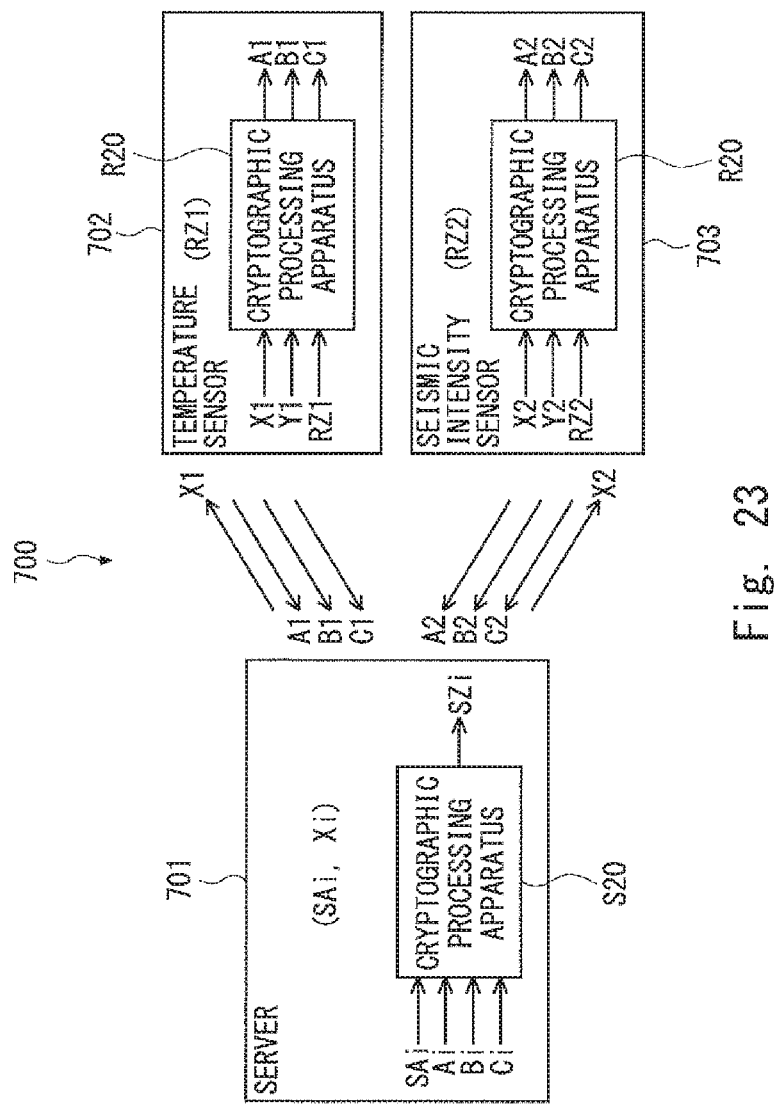
FIG. 23 schematically shows a configuration of an information collection system according to a seventh embodiment.

An information collection system 700 according to a seventh embodiment is explained. The information collection system 700 is an example in which the cryptographic processing system 200 according to the above-described second embodiment is applied and is formed as a system for securely collecting information from various sensors. FIG. 23 schematically shows a configuration of the information collection system 700 according to the seventh embodiment. The information collection system 700 includes a server 701, a temperature sensor 702, and a seismic-intensity sensor 703.

The server 701 has a configuration similar to that of the communication apparatus S2 of the cryptographic processing system 200. The server 701 may be, for example, a server that is administered by a user who possesses the server 701.

Each of the temperature sensor 702 and the seismic-intensity sensor 703 has a configuration similar to that of the communication apparatus R2 of the cryptographic processing system 200. The temperature sensor 702 and the seismic-intensity sensor 703 may be installed in an apparatus possessed by a user and may be incorporated into a semiconductor device.

In this embodiment, the server 701 outputs a signal X1 to the temperature sensor 702. The temperature sensor 702 receives the signal X1 and a random number Y1, generates a private key based on the signal X1, encrypts a signal RZ1 indicating temperature information, and outputs auxiliary information A1, an encrypted signal B1, and authentication information C1 to the server 701. The server 701 performs a decryption process based on the auxiliary information A1, the encrypted signal B1, and the authentication information C1 and, by doing so, is able to acquire a signal SZ1 identical to the signal RZ1 indicating the temperature information.

Further, in this embodiment, the server 701 outputs a signal X2 to the seismic-intensity sensor 703. The seismic-intensity sensor 703 receives the signal X2 and a random number Y2, generates a private key based on the signal X2, encrypts a signal RZ2 indicating seismic-intensity information, and outputs auxiliary information A2, an encrypted signal B2, and authentication information C2 to the server 701. The server 701 performs a decryption process based on the auxiliary information A2, the encrypted signal B2, and the authentication information C2 and, by doing so, is able to acquire a signal SZ2 identical to the signal RZ2 indicating the seismic-intensity information.

As described above, according to this configuration, it is possible to construct a system capable of securely transmitting data collected by each sensor. For example, it is particularly advantageous for security when the temperature sensor 702 and the seismic-intensity sensor 703 are installed in IoT devices. Further, the server 701 is able to provide an arbitrary cloud service using data collected from each sensor. Regarding the interface by an external input/output device, any communication method such as a wired LAN, WiFi (Registered Trademark), Bluetooth (Registered Trademark), and ZigBee (Registered Trademark) can be applied.

Eight Embodiment

Figure 24:
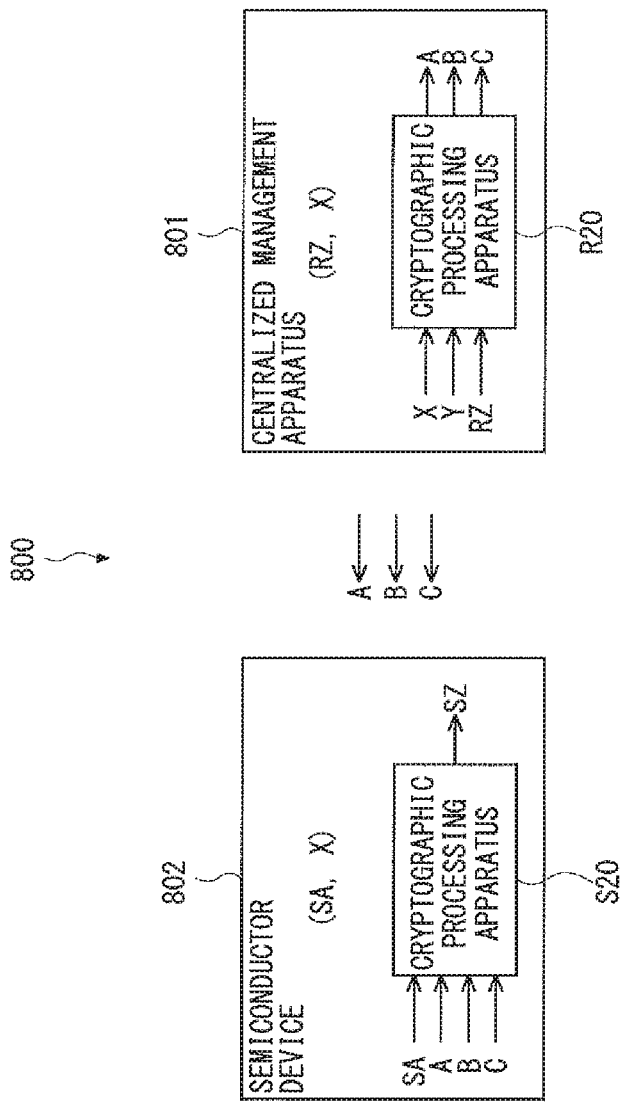
FIG. 24 schematically shows a configuration of a factory management system according to an eighth embodiment.

A factory management system 800 according to an eighth embodiment is explained. The factory management system 800 is an example in which the cryptographic processing system 400 according to the above-described fourth embodiment is applied. FIG. 24 schematically shows a configuration of the factory management system 800 according to the eighth embodiment. The factory management system 800 includes a centralized management apparatus 801 and a semiconductor device 802.

The centralized management apparatus 801 has a configuration similar to that of the communication apparatus R4 of the cryptographic processing system 400. The semiconductor device 802 has a configuration similar to that of the communication apparatus S2 of the cryptographic processing system 400. The semiconductor device 802 is a terminal that receives an instruction command from the centralized management apparatus 801 and performs an arbitrary function. The centralized management apparatus 801 may be a centralized management apparatus administered by a user and the semiconductor device 802 may be a semiconductor device installed in an apparatus installed in user's factory.

In this embodiment, when the centralized management apparatus 801 makes the semiconductor device 802 perform a certain function, it generates a private key based on a signal X and a random number Y, encrypts a signal RZ indicating instruction command, and outputs auxiliary information A, an encrypted signal B, and authentication information C to the semiconductor device 802. Note that similarly to the communication apparatus R4, the centralized management apparatus 801 is able to automatically (or autonomously) transmit data at regular intervals without waiting for a response from other apparatuses.

The semiconductor device 802 performs a decryption process based on the auxiliary information A, the encrypted signal B, and the authentication information C and, by doing so, is able to acquire a signal SZ identical to the signal RZ indicating the instruction command. In the semiconductor device 802, for example, the signal SZ is input to a control unit (not shown) and it performs a function indicated by the signal SZ. Note that the semiconductor device 802 performs authentication using the authentication information C. Then, when the authentication has failed, the semiconductor device 802 does not perform the decryption process. Therefore, when communicated data has been altered and the semiconductor device 802 has received an unintended instruction command, that instruction command is not executed.

In this embodiment, since genuineness of a received command can be determined by authentication, it is possible to relax the level of requirement for security for the communication path between the centralized management apparatus 801 and the semiconductor device 802. Therefore, for example, transmission of an encrypted instruction command from the centralized management apparatus 801 to the semiconductor device 802 may be performed through, for example, the Internet.

Ninth Embodiment

Figure 25:
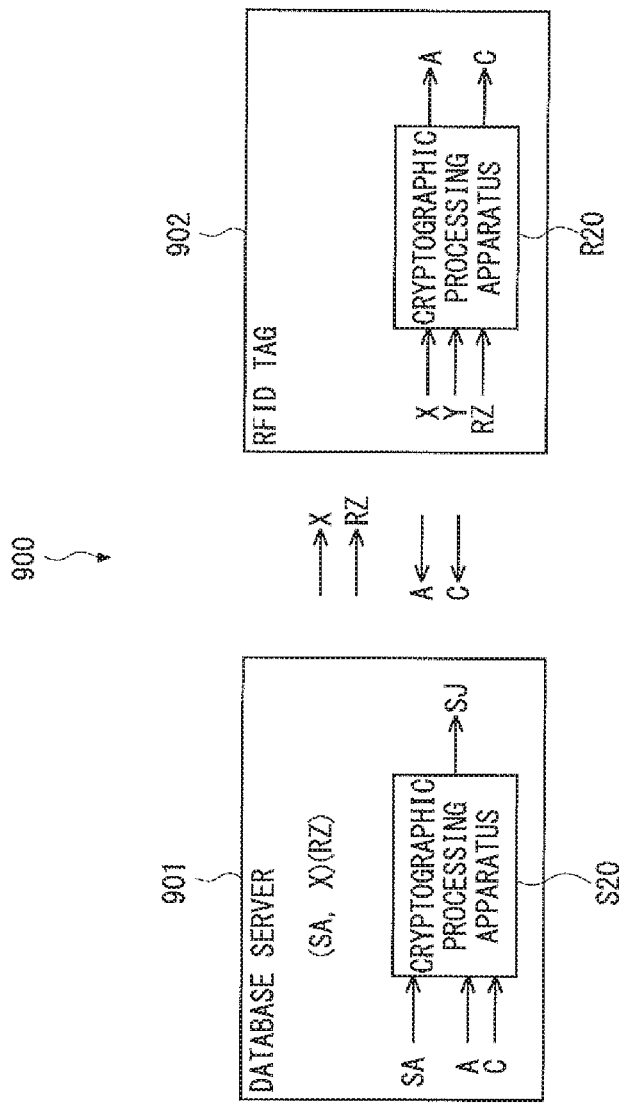
FIG. 25 schematically shows a configuration of an information management system according to a ninth embodiment.

An information management system 900 according to a ninth embodiment is explained. The information management system 900 is an example in which the cryptographic processing system 500 according to the above-described fifth embodiment is applied. FIG. 25 schematically shows a configuration of the information management system 900 according to the ninth embodiment. The information management system 900 includes a database server 901 and a communication apparatus 902.

In this example, it is assumed that the communication apparatus 902 is, for example, an arbitrary communication apparatus attached to an article, i.e., an RFID tag. The communication apparatus 902 has a configuration similar to that of the communication apparatus R2 of the cryptographic processing system 500. The database server 901 is, for example, configured to manage articles to each of which the communication apparatus 902 is attached. The database server 901 has a configuration similar to that of the communication apparatus S5 of the cryptographic processing system 500.

The database server 901 transmits a signal X and a signal RZ to the communication apparatus 902 through, for example, the Internet at an arbitrary time.

The communication apparatus 902 generates a private key based on the signal X and a random number Y, encrypts the received signal RZ1, and sends back auxiliary information A and authentication information C to the database server 901. The database server 901 performs authentication of the communication apparatus 902 by using the authentication information C and is able to determine whether the communication apparatus 902 is a legitimate apparatus to be managed.

According to this configuration, even if an outsider other than the user of the information management system 900 attaches an illegitimate communication apparatus, i.e., a replica of the communication apparatus 902 to other articles, an output signal of the physically unclonable function unit in the communication apparatus is different because it is impossible to make a replica of the physically unclonable function unit in the first place. Therefore, the illegitimate communication apparatus is never authenticated as a legitimate communication apparatus. Further, even if communicated data between the database server 901 and the communication apparatus 902 is analyzed, it is impossible to conjecture an output from a data separation unit with a meaningful probability because cryptography that is secure in terms of information theory is used as explained in the above-described embodiments. As a result, according to this embodiment, it is possible to achieve secure method/management capable of determining genuineness of a communication apparatus incorporated in an IoT apparatus or the like.

Other Embodiments

Note that the present disclosure is not limited to the above-described embodiments, and they can be modified as desired without departing from the spirit and scope of the present disclosure. For example, similarly to the cryptographic processing system 400 according to the fourth embodiment, each of the cryptographic processing systems according to the first to third and fifth embodiments may be modified so that the communication apparatus R1 includes a storage unit storing the signal X and the communication apparatus R1 is able to perform cryptographic processing without receiving the signal X from the communication apparatus S1.

The above-described embodiments are explained on the assumption that a communication apparatus that performs an encryption process (e.g., the communication apparatus R1) is separated from a communication apparatus that performs a decryption process (e.g., the communication apparatus S1). However, they may be configured so that one communication apparatus performs both the encryption process and the decryption process.

For example, the cryptographic processing apparatus R10 of the communication apparatus R1 may additionally include the error correction decryption unit S12 and the decryption calculation unit S13 of the cryptographic processing apparatus S10 of the communication apparatus S1. In this case, the random-number extraction unit SR1 and the data separation unit SR2 can be used for both the encryption process and the decryption process.

Further, for example, the cryptographic processing apparatus R20 of the communication apparatus R2 may additionally include the error correction decryption unit S12, the decryption calculation unit S13, and the comparison unit S14 of the cryptographic processing apparatus S20 of the communication apparatus S2. In this case, the random-number extraction unit SR1, the data separation unit SR2, the multiplier SR3, and the adder SR4 can be used for both the encryption process and the decryption process.

In the third embodiment, it is assumed that the signal RZ to be sent is expressed by a bit string and the encryption process and the decryption process are performed by using the XOR circuit. However, when the signal RZ can be handled as an integer value equal to or smaller than the prime number p, the encryption calculation unit R13 and the decryption calculation unit S13 may be replaced with an adder and a subtractor, respectively. In this case, the encrypted signal B becomes a result of addition of the signals RZ and RD, and the signal SZ becomes a value obtained by subtracting the signal SD from the encrypted signal B. It is assumed that each of these adder and subtractor outputs a remainder of a division of the calculation result by the prime number p. Further, it is assumed that each of the signals RD and SD is an integer equal to or smaller than the prime number p.

In the above-described embodiments, it is necessary to reverse the most significant bit depending on whether the encrypted signal B is smaller than the integer p. However, by using the above-described configuration, all the calculation can be processed as calculation of integers equal to or smaller than the prime number p.

Similarly to the cryptographic processing system 600 according to the sixth embodiment, in the cryptographic processing systems according to the first to third and fifth embodiments, needless to say, the cryptographic processing system can be constructed without forming the signal generation unit as a physically unclonable function unit and without using the signal SA by replacing the signal generation unit R11 with the signal generation unit R61 and adding the storage unit 4 storing the signal X.

In the seventh embodiment, the temperature sensor and the seismic-intensity sensor are explained. However, the server may perform cryptographic communication with one apparatus, or with three or more apparatuses. Although an example in which one semiconductor device is used is explained in the eighth embodiment, the number of the semiconductor device may be more than one. Although an example in which one RFID tag is used is explained in the ninth embodiment, the number of the communication apparatus such as the RFID tag may be more than one. Further, needless to say, XOR circuits may be used for the encryption calculation unit and the decryption calculation unit even in the cryptographic processing systems according to the fourth to ninth embodiments.

The present disclosure made by the inventors of the present application has been explained above in a concrete manner based on embodiments. However, the present disclosure is not limited to the above-described embodiments, and needless to say, various modifications can be made without departing from the spirit and scope of the present disclosure.

The above-described cryptographic processing system, the communication apparatus, and the cryptographic processing method performed by them explained in the embodiments can be described as follows.

(Supplementary Note 1)

A communication apparatus comprising: a signal generation unit configured to output a second signal obtained by giving an error in a predetermined range to a signal obtained based on a first signal; an error correction generation unit configured to output a third signal obtained based on the second signal and auxiliary information for correcting an error included in the second signal; a private-key generation unit configured to generate a first private key based on the third signal; and an encryption calculation unit configured to output an encrypted signal obtained by encrypting a fourth signal based on the first private key.

(Supplementary Note 2)

The communication apparatus described in Supplementary note 1, wherein the private-key generation unit comprises: a random-number extraction unit configured to generate a fifth signal from the third signal, the fifth signal having a value that cannot be distinguished from a truly random number; and a data separation unit configured to separate the first private key from the fifth signal and output the separated first private key, (Supplementary Note 3)

The communication apparatus described in Supplementary note 2, further comprising an authentication information generation unit configured to generate authentication information based on a private key different from the first private key and the encrypted signal and output the generated authentication information, wherein the data separation unit separates the private key used by the authentication information generation unit from the fifth signal and outputs the separated private key.

(Supplementary Note 4)

The communication apparatus described in Supplementary note 3, wherein the data separation unit separates second and third private keys from the fifth signal and outputs the separated second and third private keys, and the authentication information generation unit comprises: a multiplier configured to generate a sixth signal by multiplying the encrypted signal by the second private key; and an adder configured to generate the authentication information by adding the third private key and the sixth signal.

(Supplementary Note 5)

The communication apparatus described in Supplementary note 1, wherein the encryption calculation unit outputs an exclusive-OR of the fourth signal and the first private key as the encrypted signal.

(Supplementary Note 6)

The communication apparatus described in Supplementary note 1, wherein the first signal is input from outside of the communication apparatus to the signal generation unit.

(Supplementary Note 7)

The communication apparatus described in Supplementary note 1, further comprising a storage unit storing the first signal, wherein the first signal is input from the storage unit to the signal generation unit.

(Supplementary Note 8)

The communication apparatus described in Supplementary note 4, wherein when the fourth signal is input to the multiplier, the multiplier generates the sixth signal by multiplying the fourth signal by the second private key, and the adder generates the authentication information by adding the third private key and the sixth signal.

(Supplementary Note 9)

The communication apparatus described in Supplementary note 4, further comprising: an error correction decryption unit configured to, upon receiving auxiliary information and an encrypted signal from another communication apparatus having the same configuration as that of the communication apparatus, generate an eighth signal by correcting an error in a seventh signal based on the auxiliary information received from the another communication apparatus, the seventh signal being generated in advance by supplying the first signal to a signal generation unit of the another communication apparatus; and a decryption calculation unit configured to generate a decrypted signal by decrypting the encrypted signal received from the another communication apparatus, wherein the private-key generation unit generates a fourth private key based on the eighth signal, and the decryption calculation unit generates the decrypted signal by decrypting the encrypted signal received from the another communication apparatus based on the fourth private key.

(Supplementary Note 10)

The communication apparatus described in Supplementary note 9, wherein the random-number extraction unit generates a ninth signal from the eighth signal, the ninth signal having a value that cannot be distinguished from a truly random number, and the data separation unit separates the fourth private key from the ninth signal and outputs the separated fourth private key.

(Supplementary Note 11)

The communication apparatus described in Supplementary note 10, wherein the data separation unit separates fifth and sixth private keys from the ninth signal and outputs the separated fifth and sixth private keys, the multiplier generates a tenth signal by multiplying the encrypted signal received from the another communication apparatus by the fifth private key, and the adder generates a comparison signal by adding the sixth private key and the tenth signal.

(Supplementary Note 12)

The communication apparatus described in Supplementary note 11, further comprising a comparison unit configured to compare the authentication information received from another communication apparatus with the comparison signal, wherein the decryption calculation unit generates the decrypted signal when the comparison signal matches the authentication information received from the another communication apparatus in the comparison unit.

(Supplementary Note 13)

The communication apparatus described in Supplementary note 9, wherein the decryption calculation unit outputs an exclusive-OR of the encrypted signal received from another communication apparatus and the fourth private key as the decrypted signal.

(Supplementary Note 14)

The communication apparatus described in Supplementary note 9, wherein the first signal is input from the anther communication apparatus.

(Supplementary Note 15)

The communication apparatus described in Supplementary note 1, wherein the signal generation unit generates the second signal by supplying the first signal to a physically unclonable function and thereby giving the error in the predetermined range to the first signal.

(Supplementary Note 16)

The communication apparatus described in Supplementary note 1, wherein the signal generation unit comprises: a noise generation unit configured to generate a noise in a predetermined range; and a noise giving unit configured to generate the second signal by giving the noise generated by the noise generation unit to the first signal.

(Supplementary Note 17)

The communication apparatus described in Supplementary note 16, wherein the noise giving unit outputs an exclusive-OR of the noise generated by the noise generation unit and the first signal as the second signal.

(Supplementary Note 18)

A communication apparatus comprising: an error correction decryption unit configured to correct an error in a seventh signal based on auxiliary information for correcting an error in a second signal and thereby generate an eighth signal, the second signal being obtained by giving an error in a predetermined range to a signal obtained based on a first signal, the seventh signal being generated in advance by giving an error in a predetermined range to a signal obtained based on the first signal; a private-key generation unit configured to generate a fourth private key based on the eighth signal; and a decryption calculation unit configured to decrypt an encrypted signal based on the fourth private key and thereby generate a decrypted signal, the encrypted signal being generated by encrypting a fourth signal by a first private key generated based on the second signal.

(Supplementary Note 19)

The communication apparatus described in Supplementary note 18, wherein the private-key generation unit comprises: a random-number extraction unit configured to generate a ninth signal from the eighth signal output from the error correction decryption unit, the ninth signal having a value that cannot be distinguished from a truly random number; and a data separation unit configured to separate the fourth private key from the ninth signal and output the separated fourth private key, (Supplementary Note 20)

The communication apparatus described in Supplementary note 19, further comprising: a comparison signal generation unit configured to generate a comparison signal based on a private key different from the fourth private key and the encrypted signal; and a comparison unit configured to compare authentication information with the comparison signal, the authentication information being generated based on a private key different from the first private key and the encrypted signal, wherein the decryption calculation unit generates the decrypted signal when the comparison signal matches the authentication information in the comparison unit.

(Supplementary Note 21)

The communication apparatus described in Supplementary note 20, wherein the data separation unit separates fifth and sixth private keys from the ninth signal and outputs the separated fifth and sixth private keys, and the comparison signal generation unit comprises: a multiplier configured to generate a tenth signal by multiplying the encrypted signal by the fifth private key; and an adder configured to generate the comparison signal by adding the sixth private key and the tenth signal.

(Supplementary Note 22)

The communication apparatus described in Supplementary note 18, wherein the decryption calculation unit outputs an exclusive-OR of the encrypted signal and the fourth private key as the decrypted signal.

(Supplementary Note 23)

A cryptographic processing system comprising a first communication apparatus configured to encrypt a signal, and a second communication apparatus configured to decrypt a signal, wherein the first communication apparatus comprises: a signal generation unit configured to output a second signal obtained by giving an error in a predetermined range to a signal obtained based on a first signal; an error correction generation unit configured to output a third signal obtained based on the second signal and auxiliary information for correcting an error included in the second signal; a first private-key generation unit configured to generate a first private key based on the third signal; and an encryption calculation unit configured to output an encrypted signal obtained by encrypting a fourth signal based on the first private key, and the second communication apparatus comprises: an error correction decryption unit configured to correct an error in a seventh signal based on the auxiliary information and thereby generate an eighth signal, the seventh signal being generated in advance by supplying the first signal to the signal generation unit; a second private-key generation unit configured to generate a fourth private key based on the eighth signal; and a decryption calculation unit configured to decrypt the encrypted signal based on the fourth private key and thereby generate a decrypted signal.

(Supplementary Note 24)

The cryptographic processing system described in Supplementary note 23, wherein the first private-key generation unit comprises: a first random-number extraction unit configured to generate a fifth signal from the third signal, the fifth signal having a value that cannot be distinguished from a truly random number; and a first data separation unit configured to separate the first private key from the fifth signal and output the separated first private key, and the second private-key generation unit comprises: a second random-number extraction unit configured to generate a ninth signal from the eighth signal, the ninth signal having a value that cannot be distinguished from a truly random number; and a second data separation unit configured to separate the fourth private key from the ninth signal and output the separated fourth private key.

(Supplementary Note 25)

The cryptographic processing system described in Supplementary note 24, wherein the first communication apparatus further comprises an authentication information generation unit configured to generate authentication information based on a private key different from the first private key and the encrypted signal and output the generated authentication information, the second communication apparatus further comprises a comparison signal generation unit configured to generate a comparison signal based on a private key different from the fourth private key and the encrypted signal, and a comparison unit configured to compare the authentication information with the comparison signal, the decryption calculation unit generates the decrypted signal when the comparison signal matches the authentication information in the comparison unit, the first data separation unit separates the private key used by the authentication information generation unit from the fifth signal and output the separated private key, and the second data separation unit separates the private key used by the comparison signal generation unit from the ninth signal and output the separated private key.

(Supplementary Note 26)

The cryptographic processing system described in Supplementary note 25, wherein the first data separation unit separates second and third private keys from the fifth signal and outputs the separated second and third private keys, the authentication information generation unit comprises a first multiplier configured to generate a sixth signal by multiplying the encrypted signal by the second private key, and a first adder configured to generate the authentication information by adding the third private key and the sixth signal, the second data separation unit separates fifth and sixth private keys from the ninth signal and outputs the separated fifth and sixth private keys, and the comparison signal generation unit comprises a second multiplier configured to generate a tenth signal by multiplying the encrypted signal by the fifth private key, and a second adder configured to generate the comparison signal by adding the sixth private key and the tenth signal.

(Supplementary Note 27)

The cryptographic processing system described in Supplementary note 23, wherein the encryption calculation unit outputs an exclusive-OR of the fourth signal and the first private key as the encrypted signal, and the decryption calculation unit outputs an exclusive-OR of the encrypted signal and the fourth private key as the decrypted signal.

(Supplementary Note 28)

The cryptographic processing system described in Supplementary note 23, wherein the first communication apparatus comprises a first storage unit storing the first signal, and the first signal is input from the first storage unit to the signal generation unit.

(Supplementary Note 29)

The cryptographic processing system described in Supplementary note 23, wherein the second communication apparatus comprises a second storage unit storing the first signal, and the first signal is input from the second storage unit to the signal generation unit.

(Supplementary Note 30)

The cryptographic processing system described in Supplementary note 26, wherein the second communication apparatus further comprises a signal generation unit configured to generate the fourth signal, the fourth signal is input to the first multiplier of the first communication apparatus, in the first communication apparatus, the first multiplier generates the sixth signal by multiplying the fourth signal by the second private key, the first adder generates the authentication information by adding the third private key and the sixth signal, in the second communication apparatus, the second multiplier generates the sixth signal by multiplying the fourth signal by the fifth private key, the second adder generates the comparison signal by adding the sixth private key and the sixth signal, and the comparison unit compares the comparison signal with the authentication information and outputs a comparison result.

(Supplementary Note 31)

The cryptographic processing system described in Supplementary note 23, wherein the signal generation unit generates the second signal by supplying the first signal to a physically unclonable function and thereby giving the error in the predetermined range to the first signal.

(Supplementary Note 32)

The cryptographic processing system described in Supplementary note 23, wherein the signal generation unit comprises: a noise generation unit configured to generate a noise in a predetermined range; and a noise giving unit configured to generate the second signal by giving the noise generated by the noise generation unit to the first signal.

(Supplementary Note 33)

The cryptographic processing system described in Supplementary note 32, wherein the noise giving unit outputs an exclusive-OR of the noise generated by the noise generation unit and the first signal as the second signal.

(Supplementary Note 34)

A cryptographic processing method comprising: in a first communication apparatus, supplying a first signal to a signal generation unit; outputting a second signal obtained by giving an error in a predetermined range to the first signal; outputting a third signal obtained based on the second signal and auxiliary information for correcting an error included in the second signal; generating a first private key based on the third signal; outputting an encrypted signal obtained by encrypting a fourth signal based on the first private key; in a second communication apparatus, correcting an error in a seventh signal based on the auxiliary information and thereby generate an eighth signal, the seventh signal being generated in advance by supplying the first signal to the signal generation unit; generating a fourth private key based on the eighth signal; and decrypting the encrypted signal based on the fourth private key and thereby generating a decrypted signal.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A communication apparatus comprising:
a memory storing program instructions; and
a processor executing the stored program instructions, and configured to provide:
output a second signal obtained by giving an error in a predetermined range to a signal obtained based on a first signal;
output a third signal obtained based on the second signal and auxiliary information for correcting an error included in the second signal;
generate a first private key based on the third signal;
output an encrypted signal obtained by encrypting a fourth signal based on the first private key; and
decrypt the encrypted signal based on a fourth private key and thereby generate a decrypted signal.

2. The communication apparatus according to claim 1, wherein the generate the first private key further comprises:
to generate a fifth signal from the third signal, the fifth signal having a value that cannot be distinguished from a truly random number; and
to separate the first private key from the fifth signal and output the separated first private key.

3. The communication apparatus according to claim 2, further comprising to generate authentication information based on a private key different from the first private key and the encrypted signal and output the generated authentication information; and
to separate the private key from the fifth signal and output the separated private key.

4. The communication apparatus according to claim 3, wherein
to separate the first private key includes separate second and third private keys from the fifth signal and outputs the separated second and third private keys, and
the generate authentication information comprises:
a multiplier configured to generate a sixth signal by multiplying the encrypted signal by the second private key; and an adder configured to generate the authentication information by adding the third private key and the sixth signal.

5. The communication apparatus according to claim 1, wherein the output the encrypted signal includes output an exclusive-OR of the fourth signal and the first private key as the encrypted signal.

6. The communication apparatus according to claim 1, wherein the first signal is input from outside of the communication apparatus.

7. The communication apparatus according to claim 1, further comprising a storage memory storing the first signal, wherein
the first signal is input from the storage memory.

8. The communication apparatus according to claim 4, wherein
when the fourth signal is input to the multiplier,
the multiplier generates the sixth signal by multiplying the fourth signal by the second private key, and
the adder generates the authentication information by adding the third private key and the sixth signal.

9. The communication apparatus according to claim 4, wherein
when the communication apparatus is a first communication apparatus,
the first communication apparatus further comprises executing the stored program instructions, and configured to provide:
upon receiving auxiliary information and an encrypted signal from a second communication apparatus having the same configuration as that of the communication apparatus according to claim 4, generate an eighth signal by correcting an error in a seventh signal based on the auxiliary information received from the second communication apparatus, the seventh signal being generated in advance by supplying the first signal to a signal generation unit of the second communication apparatus; and
generate a decrypted signal by decrypting the encrypted signal received from the second communication apparatus,
generate a fourth private key based on the eighth signal, and
generate the decrypted signal by decrypting the encrypted signal received from the second communication apparatus based on the fourth private key.

10. The communication apparatus according to claim 1, wherein the output the second signal generates the second signal by supplying the first signal to a physically unclonable function and thereby giving the error in the predetermined range to the first signal.

11. The communication apparatus according to claim 1, wherein the output a second signal comprises:
to generate a noise in a predetermined range; and
to generate the second signal by giving the noise generated by the noise generator to the first signal.

12. The communication apparatus according to claim 11, wherein the to generate the second signal outputs an exclusive-OR of the noise generated and the first signal as the second signal.

13. A communication apparatus comprising:
a memory storing program instructions; and
a processor executing the stored program instructions, and configured to:
correct an error in a seventh signal based on auxiliary information for correcting an error in a second signal and thereby generate an eighth signal, the second signal being obtained by giving an error in a predetermined range to a signal obtained based on a first signal, the seventh signal being generated in advance by giving an error in a predetermined range to a signal obtained based on the first signal;
generate a fourth private key based on the eighth signal; and
decrypt an encrypted signal based on the fourth private key and thereby generate a decrypted signal, the encrypted signal being generated by encrypting a fourth signal by a first private key generated based on the second signal.

14. The communication apparatus according to claim 13, wherein the generate the fourth private key comprises:
to generate a ninth signal from the eighth signal output from the error correction decryptor, the ninth signal having a value that cannot be distinguished from a truly random number; and
to separate the fourth private key from the ninth signal and output the separated fourth private key.

15. The communication apparatus according to claim 14, further comprising:
generate a comparison signal based on a private key different from the fourth private key and the encrypted signal; and
compare authentication information with the comparison signal, the authentication information being generated based on a private key different from the first private key and the encrypted signal, wherein
generate the decrypted signal when the comparison signal matches the authentication information in the comparator.

16. The communication apparatus according to claim 15, wherein
the separate the fourth private key includes separate fifth and sixth private keys from the ninth signal and outputs the separated fifth and sixth private keys, and
the generate a comparison signal comprises:
a multiplier configured to generate a tenth signal by multiplying the encrypted signal by the fifth private key; and
an adder configured to generate the comparison signal by adding the sixth private key and the tenth signal.

17. The communication apparatus according to claim 13, further comprising output wherein the decryption calculator outputs an exclusive-OR of the encrypted signal and the fourth private key as the decrypted signal.

18. A cryptographic processing system comprising a first communication apparatus configured to encrypt a signal, and a second communication apparatus configured to decrypt a signal, wherein
the first communication apparatus comprises:
a circuit configured to provide:
a signal generation unit configured to output a second signal obtained by giving an error in a predetermined range to a signal obtained based on a first signal;
an error correction generation unit configured to output a third signal obtained based on the second signal and auxiliary information for correcting an error included in the second signal;
a first private-key generation unit configured to generate a first private key based on the third signal; and
an encryption calculation unit configured to output an encrypted signal obtained by encrypting a fourth signal based on the first private key, and the second communication apparatus comprises:
a second circuit configured to provide:
- an error correction decryption unit configured to correct an error in a seventh signal based on the auxiliary information and thereby generate an eighth signal, the seventh signal being generated in advance by supplying the first signal to the signal generator;
- a second private-key generation unit configured to generate a fourth private key based on the eighth signal; and
- a decryption calculation unit configured to decrypt the encrypted signal based on the fourth private key and thereby generate a decrypted signal.

19. The cryptographic processing system according to claim 18, wherein
the first private-key generation unit comprises:
- a first random-number extraction unit configured to generate a fifth signal from the third signal, the fifth signal having a value that cannot be distinguished from a truly random number; and
- a first data separation unit configured to separate the first private key from the fifth signal and output the separated first private key, and the second private-key generation unit comprises:
- a second random-number extraction unit configured to generate a ninth signal from the eighth signal, the ninth signal having a value that cannot be distinguished from a truly random number; and
- a second data separation unit configured to separate the fourth private key from the ninth signal and output the separated fourth private key.

20. The cryptographic processing system according to claim 19, wherein
the first communication apparatus further comprises the circuit configured to provide an authentication information generation unit configured to generate authentication information based on a private key different from the first private key and the encrypted signal and output the generated authentication information, the second communication apparatus further comprises the second circuit configured to provide a comparison signal generation unit configured to generate a comparison signal based on a private key different from the fourth private key and the encrypted signal, and a comparison unit configured to compare the authentication information with the comparison signal, the decryption calculation unit generates the decrypted signal when the comparison signal matches the authentication information in the comparison unit, the first data separation unit separates the private key used by the authentication information generator from the fifth signal and output the separated private key, and the second data separation unit separates the private key used by the comparison signal generation unit from the ninth signal and output the separated private key.

* * * * *